United States Patent [19]

Minekawa et al.

[11] Patent Number: 4,600,749
[45] Date of Patent: Jul. 15, 1986

[54] THERMOPLASTIC ELASTOMERS

[75] Inventors: Saburo Minekawa, Yokohama; Koretaka Yamaguchi, Kawasaki; Kazuo Toyomoto; Einosuke Fujimoto, both of Yokohama; Norikatu Nakayama; Shikazo Senoh, both of Kawasaki, all of Japan

[73] Assignee: Asahi Kasej Kogyo Kabushiki Kaisha, Osaka, Japan

[21] Appl. No.: 348,335

[22] Filed: Feb. 12, 1982

Related U.S. Application Data

[60] Continuation of Ser. No. 42,028, May 24, 1979, abandoned, which is a continuation of Ser. No. 850,070, Nov. 3, 1977, abandoned, which is a continuation of Ser. No. 675,212, Apr. 8, 1976, abandoned, which is a continuation of Ser. No. 259,760, Jun. 5, 1972, abandoned, which is a continuation of Ser. No. 15,210, Feb. 20, 1970, abandoned, which is a division of Ser. No. 603,120, Dec. 20, 1966, abandoned.

[30] Foreign Application Priority Data

Dec. 29, 1965 [JP] Japan ................. 40-80952

[51] Int. Cl.$^4$ ............................ C08F 297/04
[52] U.S. Cl. .................................... 525/314
[58] Field of Search ........................ 525/314

[56] References Cited

FOREIGN PATENT DOCUMENTS 884974 12/1961 United Kingdom .

Primary Examiner—Paul R. Michl
Attorney, Agent, or Firm—Abelman, Frayne, Rezac & Schwab

[57] ABSTRACT

Thermoplastic elastomers of conjugated diolefins having 4 to 6 carbon atoms and monovinyl aromatic hydrocarbons are prepared by polymerizing 8 to 65 parts by weight of a monomer mixture $A_1$ comprising a conjugated diolefin having 4 to 6 carbon atoms and a monovinyl aromatic hydrocarbon in a weight ratio of 85-10:15-90 in a hydrocarbon solvent and an inert atmosphere in the presence of 0.2 to 20 mmol., per 100 g. of the total amount of the mixture $A_1$ and the mixture $A_2$ described below, of a monolithium hydrocarbon calculated as active lithium to form an active copolymer, and after substantial completion of the polymerization, copolymerizing said active copolymer with 92 to 35 parts by weight of a monomer mixture $A_2$ comprising the same conjugated diolefin having 4 to 6 carbon atoms and monovinyl aromatic hydrocarbon as said mixture $A_1$ in a weight ratio of 95-20:5-80, such that the total amount of said mixtures $A_1$ and $A_2$ is 100 parts by weight, to thereby obtain a final copolymer having a monovinyl aromatic content of 10 to 70% by weight based on the total amount of said mixtures $A_1$ and $A_2$. The thus obtained thermoplastic elastomers have at least four polymeric blocks, and are comparable in elastic property to conventional thermoplastic elastomers and excellent in thermal resistance, resistance to oils and processability. Further, said thermoplastic elastomer does not require vulcanization or chemical cross-linking, and can be molded into an article having an excellent shape maintenance property.

4 Claims, No Drawings

THERMOPLASTIC ELASTOMERS

This application is a continuation of U.S. patent application Ser. No. 042,028, filed May 24, 1979, (now abandoned) which is a continuation of U.S. Ser. No. 850,070, filed Nov. 3, 1977 (now abandoned) which, in turn, is a continuation of U.S. Ser. No. 675,212 filed Apr. 8, 1976 (now abandoned) which, in turn, is a continuation of Ser. No. 259,760 filed June 5, 1972 (now abandoned) which, in turn, is a continuation of Ser. No. 15,210 filed Feb. 20, 1970 (now abandoned) which, in turn, is a division of Ser. No. 603,102 filed Dec. 20, 1966 (now abandoned).

This invention relates to a process for producing thermoplastic elastomers by the copolymerization of conjugated diolefins and monovinyl aromatic hydrocarbons.

As processes for producing elastomers having thermoplasticity and such elasticity as seen in ordinary vulcanized rubber, there have heretofore been a method disclosed in British Pat. No. 895,980 in which a dilithium hydrocarbon is used as polymerization initiator, and a method described in U.S. Pat. No. 3,251,905. According to these methods, conjugated diolefins are polymerized in the presence of dilithium hydrocarbon as polymerization initiator and, after completion of said polymerization, monovinyl aromatic hydrocarbons are additionally copolymerized to obtain thermoplastic elastomers having a block arrangement of A-B-A type in which monovinyl aromatic hydrocarbons (hereinafter referred to as A) are bonded onto both terminals of conjugated diolefin polymers (hereinafter referred to as B). These methods, however, suffer from such drawback that dilithium hydrocarbons, which are difficultly synthesizable as compared with monolithium hydrocarbons, in general, are required to be used as polymerization initiators. Particularly when a part of lithium in the dilithium hydrocarbons is incorporated with monolithium hydrocarbons to bring about deterioration in physical properties, particularly tensile strength and elastic recovery, of the resulting thermoplastic elastomers. In order to obtain thermoplastic elastomers, excellent in physical properties, therefore, extremely high purity dilithium hydrocarbons should always be prepared. This is a great drawback in practicing the above methods on a commercial scale, coupled with the fact that the purification of dilithium hydrocarbons is difficult, in general, as compared with the case of monolithium hydrocarbons.

British Pat. No. 817,695 describes in a park of the examples thereof, though said patent is not directed only to the production of thermoplastic elastomers, a process in which a mixture of a conjugated diolefin and a monovinyl aromatic hydrocarbon is copolymerized in the presence of a dilithium hydrocarbon as polymerization initiator. In this case, due to the difference in copolymerization reactivity between the conjugated diolefin and the monovinyl aromatic hydrocarbon, the conjugated diolefin first polymerizes, and the monovinyl aromatic hydrocarbon block copolymerizes on both ends of the above polymer, with the result that a block polymer of the aforesaid A-B-A type is obtained. However, the above process also uses a dilithium hydrocarbons as a polymerization initiator and hence suffers as well from such drawback that various difficulties are brought about in producing thermoplastic elastomers excellent in physical properties.

Relatively recently, there have been announced, according to Belgian Pat. No. 627,652 and U.S. Pat. No. 3,231,635, methods in which monovinyl aromatic hydrocarbons are polymerized in the presence of monolithium hydrocarbons, particularly secondary or tertiary monolithium hydrocarbons, thereafter conjugated diolefins are additionally copolymerized and further monovinyl aromatic hydrocarbons are additionally copolymerized to obtain thermoplastic elastomers of the aforesaid A-B-A type. These methods involve methods in which monovinyl aromatic hydrocarbons are polymerized in the presence of monolithium hydrocarbons, conjugated diolefins are charged in the polymerization system after completion of the above polymerization, and monovinyl aromatic hydrocarbons are additionally copolymerized, after said conjugated diolefins have been consumed by the polymerization, under such conditions that the monovinyl aromatic hydrocarbons can further be polymerized, to obtain thermoplastic elastomers of the aforesaid A-B-A type. The drawbacks of the former methods are such that in order to homogeneously dissolve the initially obtained monovinyl aromatic hydrocarbon polymers, the polymerization solvents to be used are limited to naphthenic or aromatic hydrocarbon solvents or solvents composed mainly of said hydrocarbons, that the additional copolymerization operation, which is complex, should be effected twice, and that during the above operation, the copolymers are exposed to a great danger of inactivation due to impurities. Further, the drawbacks of the latter methods are such that, although the additional copolymerization operation is required to be effected only once, it is extremely difficult, in practice, to obtain with favorable reproducibility A-B-A type thermoplastic elastomers by charging suitable amounts of conjugated diolefins at a suitable time during the course of polymerization of monovinyl aromatic hydrocarbons.

Generally, in case A-B-A type block polymers are incorporated with A-polymers, B-polymers or A-B type polymers formed by the inactivation of the block polymers during the course of polymerization, the block polymers are deteriorated in properties as elastomers, particularly in elastic recovery. Therefore, in practicing the aforesaid methods on commercial scale, there is a great danger of frequently inviting deterioration in behaviors of the elastomers.

According to Belgian Pat. Nos. 646,355 and 647,860, there have been proposed another processes for the production of A-B-A type thermoplastic elastomers. These processes are carried out by polymerizing a monovinyl aromatic hydrocarbon in the presence of a monolithium hydrocarbon, additionally copolymerizing the resulting polymer with a conjugated diolefin to form an active block polymer of the A-B-Li type, and, in the case of Belgian Pat. No. 646,835, adding to said active block polymer a dialkenyl aromatic hydrocarbon to bond at least 2 A-B type block polymers thereby obtaining a substantially A-B-A type thermoplastic elastomer, while in the case of Belgian Pat. No. 647,860, adding to said active block polymer a hydrocarbon dihalide to bond 2 A-B type block polymers thereby obtaining an A-B-A type thermoplastic elastomer. In either of the above processes, however, a monovinyl aromatic hydrocarbon is required to be first polymerized and therefore the polymerization solvent to be used is limited to a naphthenic or aromatic hydrocarbon solvent or to a solvent composed mainly of said hydrocarbon. Further, although the additional copolymerization operation may be effected once, another coupling operation should be carried out once. Thus, the above processes are complex in operations, as well. Further, said coupling reaction is a reaction to bond each other the terminals of high molecular weight substances and therefore the reaction is not always high in efficiency. Consequently, the resulting A-B-A type block polymer is ordinarily incorporated with a considerable proportion of A-B type block polymer to bring about such drawback that the thermoplastic elastomer frequently suffers from lowering in physical properties.

As mentioned above, all the conventional methods for producing thermoplastic elastomers encounter difficulty in polymerization initiators, are complex in production steps, are restricted in polymerization solvents or require the coupling reaction between high molecular weight substances which is low in reaction efficiency. Therefore, in practicing on commercial scale, the conventional methods accompany many difficulties or inconveniences and suffer from such great drawback that the products are liable to be lowered in physical properties as elastomers. Further, molded articles obtained from A-B-A type thermoplastic elastomers prepared according to the conventional methods have, in general, such drawback that they are readily deformed at elevated temperatures, particularly at temperatures above 90° C., and are low in ability to maintain their shapes particularly at above 100° C., with the result that they tend to lose their commodity values due to the deformation. Further, when subjected to tension, said molded articles readily from constricted portions to bring about a so-called necking phenomenon. Thus, the thermoplastic elastomers obtained according to the conventional methods suffer from the drawback that they are poor in reproducibility of physical properties as elastomers.

An object of the present invention is to provide a markedly useful process for the commercial production of thermoplastic elastomers which comprises polymerizing in the presence of a lithium base catalyst a monomer mixture of a conjugated diolefin and a monovinyl aromatic hydrocarbon in an inert atmosphere in a polymerization medium selected from hydrocarbon solvents of a wide scope including paraffinic hydrocarbon solvents and, after substantial completion of the polymerization, additionally copolymerizing at least once the resulting active copolymer with a monomer mixture of the same conjugated diolefin and monovinyl aromatic hydrocarbon as above.

Another object is to provide the thermoplastic elastomers having, in practice, such markedly useful characteristics that, when compared with the conventional thermoplastic elastomers, they are comparable thereto in elastic properties, excellent in thermal resistance and less in elasticity lowering at elevated temperatures, and molded articles made therefrom are excellent in property to maintain their shapes and scarcely develop the necking phenomenon.

A further object is to provide a process for producing thermoplastic elastomers excellent in resistance to heat and oils and wide in practical application field.

A still further object is to provide thermoplastic elastomer compositions improved in processability.

These objects of the present invention can be achieved according to the following procedures:

A monomer mixture of a conjugated diolefin and a monovinyl aromatic hydrocarbon is polymerized in the presence of a lithium base catalyst in a hydrocarbon solvent in an inert atmosphere. After substantial completion of the polymerization, the resulting active copolymer is additionally copolymerized at least once with a monomer mixture of the same conjugated diolefin and monovinyl aromatic hydrocarbon as above to produce a thermoplastic elastomer comprising conjugated diolefin and monovinyl aromatic hydrocarbon. Concretely, the above procedures are effected in the following manner: To 8–65 parts by weight of a monomer mixture ($A_1$) comprising a conjugated diolefin and a monovinyl aromatic hydrocarbon in a weight ratio of 85–10:15–90 is added a monolithium hydrocarbon in an amount, as active lithium, of 0.2–20 mmol per 100 g of the total amount of said mixture $A_1$ and the mixture $A_2$, which will be mentioned later, and the mixture is polymerized in a hydrocarbon solvent in an inert atmosphere. After substantial completion of the polymerization, the resulting active copolymer is additionally copolymerized with 92–35 parts by weight of a monomer mixture ($A_2$) comprising the same conjugated diolefin and monovinyl aromatic hydrocarbon as above in a weight ratio of 95–20:5–80, so that the total amount of said $A_1$ and $A_2$ becomes 100 parts by weight, to obtain a final copolymer having a monovinyl aromatic hydrocarbon content of 10–70% by weight. In the above manner, a thermoplastic elastomer excellent in physical properties, which is composed of a conjugated diolefin and a monovinyl aromatic hydrocarbon, can be produced.

In the process of the present invention, the conjugated diolefins to be used are those having 4–6 carbon atoms and include, for example, 1,3-butadiene, isoprene, 2,3-dimethyl-1,3-butadiene and 1,3-pentadiene (piperylene). These may be used either alone or in admixture. Further, the monovinyl aromatic hydrocarbons to be used are aromatic hydrocarbons having one vinyl group directly bonded to the aromatic nucleus and include, for example, styrene, p-methylstyrene, m-methylstyrene, o-methylstyrene, p-ethylstyrene, m-ethylstyrene, o-ethylstyrene, $\alpha$-vinylnaphthalene and $\beta$-vinylnaphthalene. These may be used either alone or in admixture.

Suitable solvents as the polymerization media employed in practicing the process of the present invention are, in general, hydrocarbon solvents including paraffinic hydrocarbon solvents, e.g. pentane, hexane, heptane, octane, monane and decane; naphthenic hydrocarbon solvents, e.g. cyclohexane, methylcyclohexane, ethylcyclonexane and 1,4-dimethylcyclohexane; and aromatic hydrocarbon solvents, e.g. benzene, toluene, ethylbenzene, xylene, diethylbenzene and propylbenzene. These hydrocarbon solvents are used either alone or in admixture of 2 or more. Generally, the copolymerization reactivity of conjugated diolefins and monovinyl aromatic hydrocarbons by use of lithium base catalysts is improved, due to the presence of a polar compound, such as ether, thioether or tertiary amine, to bring about a tendency of random copolymerization. In the present process, such polar compounds or other substances enhancing the random copolymerization should be used in amounts within a range in which the resulting copolymers substantially maintain properties as thermoplastic elastomers. However, these may also be used in amounts suitable for controlling the monomer reactivity ratio of conjugated diolefins and monovinyl aromatic hydrocarbons and modifying the properties of the resulting copolymers as elastomers. In the present invention, the conjugated diolefin and the monovinyl aromatic hydrocarbon, must be different in so-called monomer reactivity ratio when reacted with a lithium base catalyst and also must be different in copolymerizability. Therefore, when conjugated diolefin and monovinyl aromatic hydroxarbon are polymerized by use of a lithium base catalyst, the conjugated diolefin is first polymerized and then the resulting polymer is copolymerized with the monovinyl aromatic hydrocarbon substantially in the form of a block, whereby an active block copolymer is formed. Such an active block copolymer is easily soluble not only in a naphthenic or aromatic hydrocarbon solvents but also in a paraffinic hydrocarbon solvents, and therefore the reaction readily proceeds uniformly. When the above active copolymer is additionally copolymerized at least once with a mixture of the same conjugated diolefin and monovinyl aromatic hydrocarbon as in the aforesaid monomer mixture, a thermoplastic elastomer can be easily obtained. The operation of additionally copolymerizing the mixture of the same conjugated diolefin and monovinyl aromatic hydrocarbon as in the initially polymerized monomer mixture may be effected not only once but twice or more. However, in order to attain excellent physical properties as a thermoplastic elastomer, one time additional copolymerization operation is sufficient. In view of the simplification of production steps also, it is needless to say that one time additional copolymerization operation is advantageous.

The polymerization system should have been freed, as much as possible, for injurious impurities which might inactivate active lithium contained in the polymerization initiator or in the resulting polymer, such as for example, water, oxygen, carbon dioxide, acetylene compounds, halogen compounds, alcohols, organic acids and inorganic acids. Therefore, the polymerization medium, conjugated diolefin and monovinyl aromatic hydrocarbon to be used in the polymerization should have thoroughly been purified. Further, from the above viewpoint, the atmosphere of the polymerization system is required to have been substituted by an inert gas such as nitrogen, helium, neon or argon containing no injurious impurities.

In the present invention, lithium base catalysts employed as the polymerization initiators are lithium metal, monolithium hydrocarbons and polylithium hydrocarbons having 2 or more lithium atoms. However, in view of the properties as elastomers of the thermoplastic elastomers obtained in accordance with the process of the present invention, particularly preferable lithium base catalysts are monolithium hydrocarbons having one lithium atom in which the hydrocarbon group may be any of alkyl, cycloalkyl, aryl, alkaryl and aralkyl groups. These include, for example, saturated alkyl monolithium compounds such as methyllithium, ethyllithium, propyllithium, butyllithium, amyllithium, hexyllithium, 2-ethylhexyllithium, hexadecyllithium and cyclohexyllithium; unsaturated alkyl monolithium compounds such as allyllithium and methallyllithium; aryllithium compounds, alkaryllithium compounds and aralkyllithium, such as phenyllithium, tolyllithium, ethylbenzenelithium, xyllithium and α-naphthyllithium. Of these, those which are particularly easily obtainable and favorable in solubility are n-butyllithium and sec-butyllithium. These monolithium hydrocarbons may be used either alone or in admixture of 2 or more.

In the process of the present invention, the monovinyl aromatic hydrocarbon content of the mixture of conjugated diolefin and monovinyl aromatic hydrocarbon, which is first polymerized by use of a monolithium hydrocarbon, is preferably from 15% to 90% by weight. In case the said content is less than 15% by weight, the finally obtained copolymer is deteriorated in elastic properties. On the other hand, in case the content is more than 90% by weight, the finally obtained copolymer is lowered in thermal resistance. Moreover, the polymerization medium to be used is greatly restricted and is limited only to a naphthenic or aromatic hydrocarbon solvent or to a solvent composed mainly of said hydrocarbon. This results in such drawbacks that the initially formed copolymer is lowered in solubility for paraffinic aliphatic hydrocarbon solvents to make it impossible to obtain a homogeneous solution or a slurry excellent in dispersibility and, in the subsequent additional copolymerization by addition of a mixture of conjugated diolefin and monovinyl aromatic hydrocarbon, the copolymerization reaction hardly proceeds uniformly, whereby the finally obtained copolymer is lowered in physical properties.

In the polymerization, the concentration of the mixture of conjugated diolefin and monovinyl aromatic hydrocarbon in a polymerization medium solution is 5–30%, preferably 5–20% by weight, though the concentration is not limited thereto. Generally, in case the concentration is low, stirring at the time of polymerization is easy but the amount of solvent used is disadvantageously large, while in case the concentration is high, stirring becomes difficult but the amount of solvent employed is advantageously small.

The polymerization temperature is from $-30°$ to $120°$ C., ordinarily from $10°$ to $100°$ C., and preferably from $30°$ to $80°$ C. In case the temperature is excessively low, the polymerization rate becomes low to bring about practical disadvantage, while in case the temperature is excessively high, there is increased a danger of inactivation of active lithium in the resulting polymer. Particularly at excessively high temperatures, impurities which are low in reactivity at relatively low temperatures act on the active lithium to inactivate the same.

A mixture of conjugated diolefin and monovinyl aromatic hydrocarbon is subjected to polymerization. After substantial completion of the polymerization, the resulting active copolymer is incorporated with a mixture of the same monomers as employed before, from which have been removed such impurities as to inactivates the active lithium on the terminal of said copolymer, to further initiate and progress copolymerization reaction from the active lithium on the terminal of said active copolymer, whereby the final copolymer is formed and thus a thermoplastic elastomer which is the characteristic of the present invention is obtained. The temperature adopted in said additional copolymerization is from $-30°$ to $120°$ C., ordinarily from $10°$ to $100°$ C., and preferably from $30°$ to $100°$ C. In the above manners, the final copolymer is obtained in the form of a solution or of a slurry excellent in dispersibility.

The final copolymer thus obtained is ordinarily incorporated with at least one kind of stabilizers, preventing from deterioration due to oxygen, ozone, ultraviolet light and heat. These stabilizers may be added after once inactivating the copolymer by addition of substances so easily reactive with active lithium as to inactivate the active lithium of the final copolymer, such as for example, water, alcohol, organic acids, inorganic acids, phenols, primary amines or secondary amines. Thereafter, the copolymer solution or slurry is freed from solvent by volatilization, filtration or centrifugalizing, either as such or after once coagulating the solution or slurry with water, whereby a dry copolymer is obtained.

The monovinyl aromatic hydrocarbon content of the conjugated diolefin-monovinyl aromatic hydrocarbon mixture to be added to the initially obtained active copolymer is preferably from 5 to 80% by weight. In case said content is less than 5% by weight, the finally obtained copolymer is lowered in tensile strength and elastic properties, while in case the content is more than 80% by weight, the finally obtained copolymer is deprived of elastic properties, particularly elongation. Further, the monovinyl aromatic hydrocarbon content of the final copolymer is preferably within the range of from 10 to 70% by weight. In case said content is less than 10% by weight, the final copolymer is lowered in elastic properties and is deprived of hardness, while in case the content is more than 70% by weight, the final copolymer is deteriorated in elongation and elastic recovery becoming to an elastomer and is lowered in thermal resistance.

The amount of the conjugated diolefin-monovinyl aromatic hydrocarbon mixture to be initially polymerized is preferably from 8 to 65% by weight based on the total amount of monomers employed including those in the mixture to be additionally polymerized. In case the amount of said mixture is less than 8% by weight, the final copolymer is lowered in thermal resistance, while in case the amount is more than 65% by weight, the final copolymer is deteriorated in properties as an elastomer.

As mentioned above, in accordance with the process of the present invention, thermoplastic elastomers which are superior in thermal resistance, particularly in dimension stability at elevated temperatures, and less in necking phenomenon, as compared with the conventionally known thermoplastic elastomers, can be easily obtained by copolymerizing a mixture of conjugated diolefin and monovinyl aromatic hydrocarbon by use of a monolithium hydrocarbon as polymerization initiator, and additionally copolymerizing the resulting active copolymer solution with a mixture of conjugated diolefin and monovinyl aromatic hydrocarbon.

In the present invention, the kinds of monomers in the mixture to be used in the additional copolymerization are the same as those of monomers in the mixture to be initially copolymerized. Because the use of mixtures of such monomers is simple and easy when the process is carried out on commercial scale and the resulting thermoplastic elastomers are sufficiently excellent in physical properties.

The monovinyl aromatic hydrocarbon content of the initially polymerized monomer mixture ($A_1$) is not necessarily equaly to that of the additionally polymerized monomer mixture ($A_2$), and the two mixtures $A_1$ and $A_2$ may be suitably differed in monovinyl aromatic content to change the physical properties of the final copolymer. However, in case the final copolymer is required to be particularly high in tensile strength, the absolute monovinyl aromatic hydrocarbon content of the mixture $A_1$ is desirably close to that of the mixture $A_2$. In case the final copolymer is required to be particularly high in thermal resistance, the monovinyl aromatic hydrocarbon content of the mixture $A_1$ is desirably lower than that of the mixture $A_2$. Further, in case the final copolymer is required to be great in hardness, it is desirable that the mixture $A_1$ be higher than the mixture $A_2$ in monovinyl aromatic hydrocarbon content and be relatively high in absolute amount of monovinyl aromatic hydrocarbon, and also the final copolymer be high in said content.

In the process of the present invention, the most common conjugated diolefins are 1,3-butadiene and isoprene. These may be used either independently or in admixture in optional proportions. Further, the most common monovinyl aromatic hydrocarbon is styrene. Even when the monomers are limited to these, various thermoplastic elastomers can be obtained by suitable selection of the monomer compositions of the mixture $A_1$ and $A_2$, as shown in the following table:

| No. | Composition of $A_1$ | Composition of $A_2$ |
| --- | --- | --- |
| 1 | Bd. St. | Bd. St. |
| 2 | Ip. St. | Ip. St. |
| 3 | Bd. Ip. St. | Bd. Ip. St. |

In the above table, Bd., Ip., and St. represents 1,3-butadiene, isoprene and styrene, respectively.

In case the conjugated diolefin in the final copolymer is isoprene or is composed mainly of isoprene, the copolymer is excellent in thermoplasticity. Further, in case the conjugated diolefin in the final copolymer is 1,3-butadiene or is composed mainly of 1,3-butadiene, the copolymer is high in thermal resistance and scarcely exhibits the necking phenomenon.

As has been mentioned, the process of the present invention is advantageous in that a thermoplastic elastomer having practically satisfactory physical properties can be obtained by single additional copolymerization operation and the production steps can be simplified when the process is effected on a commercial scale. It is not objectionable to repeat 1 to 5 times, ordinarily 2 to 3 times the operation of additionally copolymerizing the same monomer mixture as the initially polymerized monomer mixture. However, the repetition is not always required for the production of thermoplastic elastomers. As the number of times of the additional copolymerization operation is increased, the final copolymer is lowered in tensile strength and deteriorated in elastic recovery and the like, in general, when the monovinyl aromatic hydrocarbon content of the final copolymer is definite. Further, when the number of times of the additional copolymerization operation is increased, the opportunity of incorporation of impurities, which inactivate the active lithium on the terminal of a copolymer which has already been formed at the time of addition of additional monomer mixture, increases as much and the final copolymer is incorporated with copolymers of various structures and is deteriorated in physical properties, particularly tensile strength and elastic recovery. From the above viewpoint, it may be said that one time additional copolymerization operation is sufficient, though the repetition of such operation is not objectionable.

Even in the case where the additional copolymerization operation is to be repeated 2 or more times, the monovinyl aromatic hydrocarbon content of the final copolymer preferable as a thermoplastic elastomer is desirably from 10 to 70% by weight, and the amount of active lithium contained in the lithium base catalyst is desirably from 0.2 to 20 mmol per 100 g of the total monomers. In the above case, the compositions of conjugated diolefin and monovinyl aromatic hydrocarbon in the initially copolymerized monomer mixture and additionally copolymerized monomer mixture are suitably selected depending on the physical properties desired for the final copolymer.

The present inventors have further been able to achieve an improvement in thermal resistance and oil resistance of the thermoplastic elastomers obtained according to the present process by adding to the copolymerization system a small amount of a divinyl aromatic hydrocarbon, particularly divinylbenzene, and by chemically cross-linking chiefly the monovinyl aromatic hydrocarbon portion of the copolymerization system with said divinyl aromatic hydrocarbon, particularly divinylbenzene. That is, the inventors have found that a thermoplastic elastomer excellent in thermal resistance and oil resistance can be obtained by adding a small amount of a divinyl aromatic hydrocarbon to a conjugated diolefin-monovinyl aromatic hydrocarbon mixture, polymerizing the mixture in a hydrocarbon solvent in the presence of a monolithium hydrocarbon as polymerization initiator, and then additionally copolymerizing the resulting active copolymer with a conjugated diolefinmonovinyl aromatic hydrocarbon mixture incorporated with a small amount of divinyl aromatic hydrocarbon. In the above case, both the initially polymerized monomer mixture $A_1$ and the additionally copolymerized monomer mixture $A_2$ may be incorporated, respectively, with a small amount of a divinyl aromatic hydrocarbon. Even when a divinyl aromatic hydrocarbon has been added to only one of the mixtures $A_1$ and $A_2$, a considerable improvement in thermal resistance and oil resistance is observed. That is, the process may be effected in such a manners that the mixture $A_1$ is first polymerized in the presence of a monolithium hydrocarbon and then the resulting active copolymer is additionally copolymerized with the mixture $A_2$ incorporated with a small amount of a divinyl aromatic hydrocarbon, or the mixture $A_1$ incorporated with a small amount of a divinyl aromatic hydrocarbon is first polymerized in the presence of a monolithium hydrocarbon and then the resulting active copolymer is additionally copolymerized with the mixture $A_2$. When a divinyl aromatic hydrocarbon is added to only one of the mixtures $A_1$ and $A_2$, the resulting thermoplastic elastomer is not so improved in thermal resistance and oil resistance but is excellent in processability due to thermoplasticity, as compared with the case where no divinyl aromatic hydrocarbon is added to both of the mixtures. Therefore, in case the resulting elastomer is desired to be improved in thermal resistance and oil resistance, the divinyl aromatic hydrocarbon is added to both the mixtures $A_1$ and $A_2$. On the other hand, in case the processability of the resulting elastomer is desired to be maintained, somewhat depressing the improvement in thermal resistance and oil resistance, the divinyl aromatic hydrocarbon is desirably added to either one of the mixtures $A_1$ and $A_2$. In these cases, the monovinyl aromatic hydrocarbon contents of the mixtures $A_1$ and $A_2$ are not required to be differentiated from the case where no divinyl aromatic hydrocarbon is added. Therefore, the total monovinyl aromatic hydrocarbon content of the finally obtained copolymer may also be the same as in the case where no divinyl aromatic hydrocarbon is used.

The divinyl aromatic hydrocarbons employed in the present invention are aromatic hydrocarbons having 2 vinyl groups directly bonded to the aromatic nucleus. Concretely, these include o-divinylbenzene, m-divinylbenzene, p-divinylbenzene, 1,3-divinylnaphthalene, 1,4-divinylnaphthalene, 1,5-divinylnaphthalene and the like. Of these, divinylbenzenes are most commonly used. These may be used either alone or in admixture of 2 or more.

The amount of divinyl aromatic hydrocarbon employed is preferably 0 to 4.5 parts by weight per 100 parts by weight of the initially polymerized mixture $A_1$. In case the amount is more than 4.5 parts by weight, the resulting copolymer is greatly lowered in tensile strength. Further, the amount of said hydrocarbon is desirably from 0 to 0.55 part by weight per 100 parts by weight of the additionally copolymerized mixture $A_2$. In case the amount is greater than 0.55 part by weight, the resulting copolymer is greatly lowered in thermoplasticity and tensile strength. The total amount of divinyl aromatic hydrocarbon in the finally obtained copolymer is preferably from 0.001 to 0.5 part by weight per 100 parts by weight of the total content of conjugated diolefin and monovinyl aromatic hydrocarbon. The larger the amount of divinyl aromatic hydrocarbon used, the more improved the thermal resistance and oil resistance of the resulting copolymer. However, in case the amount is more than 0.5 part by weight, the resulting elastomer is lowered in elasticity and loses its inherent characteristic. Moreover, the elastomer is lowered in such physical properties as tensile strength and elongation and is deteriorated in processability. In case the amount of divinyl aromatic hydrocarbon is less than 0.001% by weight, no substantial improvement in thermal resistance and oil resistance is observed.

In view of the above points, the improvement in thermal resistance and oil resistance of the thermoplastic elastomer in accordance with the present process is achieved in the following manners: To 8-65 parts by weight of a monomer mixture $A_1$ comprising a conjugated diolefin and a monovinyl aromatic hydrocarbon in a weight ratio of 85-10:15-90 is added 0-4.5 parts by weight per 100 parts by weight of said mixture $A_1$ of a divinyl aromatic hydrocarbon. To the resulting mixture $A_1$ is added a monolithium hydrocarbon in an amount as active lithium of 0.2-20 mmol per 100 g of the total amount of said mixture $A_1$ and a mixture $A_2$, which will be mentioned later, and the mixture is polymerized in a hydrocarbon solvent in an inert atmosphere. After substantial completion of the polymerization, the resulting active copolymer is incorporated with and additionally copolymerized with a mixture $A_2'$, prepared by adding to 92-35 parts by weight of a monomer mixture $A_2$ comprising the same conjugated diolefin and monovinyl aromatic hydrocarbon as in the mixture $A_1$ 0-0.55 part by weight per 100 parts by weight of said mixture $A_2$ of said divinyl aromatic hydrocarbon, under such conditions that the total amount of the divinyl aromatic hydrocarbon in the mixtures $A_1'$ and $A_2'$ becomes 0.001 to 0.5 part by weight per 100 parts by weight of the total amount of the mixtures $A_1$ and $A_2$, and that the total amount of the mixtures $A_1$ and $A_2$ becomes 100 parts by weight. As the result, there is produced a thermoplastic elastomer excellent in thermal resistance and oil resistance which has a monovinyl aromatic content of 10 to 70% by weight and which is composed mainly of the conjugated diolefin and monovinyl aromatic hydrocarbon.

When, according to the above procedures, the mixture of conjugated diolefin, monovinyl aromatic hydrocarbon and divinyl aromatic hydrocarbon is polymerized in a hydrocarbon solvent in the presence of monolithium hydrocarbon as a polymerization initiator, the conjugated diolefin first polymerizes, due to the difference in copolymerization reactivity of the monomers, and the divinyl aromatic hydrocarbon chiefly copolymerizes with the monovinyl aromatic hydrocarbon to mainly contribute to the cross-linking of the monovinyl aromatic hydrocarbon portion. This cross-linking contributes to the improvement in thermal resistance and oil resistance of the resulting thermoplastic elastomer. However, the enhancement of such cross-linking reduces the thermoplasticity of the elastomer and tends to lower the processability thereof, though the lowering of processability can be overcome by addition of various plasticizers as will be mentioned later.

In producing a thermoplastic elastomer in accordance with the process of the present invention, the amount of monolithium may desirably be so selected that when n millimole (noted as m mole hereafter) of said hydrocarbon as active lithium is used per 100 g of the total amount of the mixtures $A_1$ and $A_2$ employed to obtain the final copolymer, the value M in the equation $M = (100/n) \times 10^3$ is within the range of from $5 \times 10^3$ to $50 \times 10^4$, i.e. n is in the range of 0.2 to 20, M is a calculated average molecular weight. In csse the value M is less than $5 \times 10^3$, the final copolymer is poor in mechanical properties, particularly in tensile strength, while in case M is more than $50 \times 10^4$, the processability of the final copolymer is undesirably lowered. In case, in the production of a thermoplastic elastomer, no divinyl aromatic hydrocarbon has been copolymerized, the value M is preferably in the range of $3 \times 10^4$ to $50 \times 10^4$ in order maintain the tensile strength of the elastomer.

The thermoplastic elastomer obtained according to the present process has such excellent properties as mentioned below.

The tensile strength of the elastomer is from 100 kg/cm$^2$ to 400 kg/cm$^2$, and there can also be obtained one having a tensile strength comparable to or more than that of a vulcanizate of known synthetic rubber or natural rubber. The elongation at break of the elastomer is variable over such a wide range as from several hundred % to 2,000%. The modulus at 300% elongation of the elastomer is optionally variable within such a wide range from 5 kg/cm$^2$ to 50 kg/cm$^2$. The elastic recovery of the elastomer is so excellent as to be comparable to a vulcanizate of known synthetic rubber or natural rubber. Further, the present elastomer is more excellent in thermal resistance and oil resistance than a conventional thermoplastic elastomer and difficultly suffers from necking phenomenon. Moreover, the tensile strength of the present elastomer is higher than that of a conventional elastomer even when the two elastomers are equal in hardness, and the hardness thereof can be easily varied, while maintaining the excellent properties, so as to be suitable for the desired harness of the product.

The modulus and hardness of the thermoplastic elastomer obtained according to the present process can be suitably enhanced by incorporation of such a filler as carbon black, magnesium carbonate, calcium carbonate, titanium oxide or finely divided silicic anhydride.

On the other hand, in order to further improve the processability of the thermoplastic elastomer obtained in accordance with the present process or to lower and suitably control the modulus or hardness thereof while maintaining the properties becoming to an elastomer, the thermoplastic elastomer may be incorporated with a paraffinic, naphthenic or aromatic process oil which is ordinarily used in admixture with natural rubber or synthetic rubbers. Particularly, a paraffinic process oil is preferable, because the elastomer is not particularly lowered in tensile strength due to the incorporation of said oil, and liquid paraffin is also suitable for such purpose. Further, it is also possible to use various plasticizers ordinarily used for thermoplastics, such as for example, dioctyl phthalate, dibutyl phthalate and tricresyl phosphite.

As an additive to further improve the processability of the thermoplastic elastomer obtained according to the present process, a polyester is useful. That is, it is useful to add 1–40 parts by weight per 100 parts by weight of the thermoplastic elastomer of a polyether having a molecular weight of 200–50,000 in which the divalent aliphatic hydrocarbon of the fundamental molecule has 2–10 carbon atoms. The polyether may be added together with a process oil. When the polyester is added in an amount within the range of from 2–20 parts, particularly 5–15 parts, by weight, the thermoplastic elastomer is greatly improved in processability. Further, no blooming phenomenon of the polyether from the elastomer is observed, and the elastomer is not substantially lowered in tensile strength. In case the amount of polyester added is less than 1 part by weight, no substantial improvement in processability of the elastomer is observed. On the other hand, in case the amount is more than 40 parts by weight, the elastomer is greatly lowered in tensile strength and the blooming phenomenon of the added polyether from the elastomer becomes marked, though the plasticized elastomer is favorable in fluidity at elevated temperatures. In case the molecular weight of the polyether is less than 200, the polyether is greatly reduced in amount, due to its high volatility, at the time of processing the plasticized elastomer at elevated temperatures. Further, the blooming phenomenon of the polyether from the elastomer is marked and the effect of such polyether as a plasticizer is low. On the other hand, in case the molecular weight of the added polyether is more than 50,000, the elastomer is low in fluidity at room temperature and thus the polyether is low in plasticizing effect at room temperature. Particularly preferable polyethers are those having a molecular weight within the range of from 300 to 10,000. Such polyethers are not always required to have 2 terminal groups but may have 3 or more terminal groups and include those having up to 6 terminal groups. Such polyethers ordinarily have hydroxyl groups as the terminal groups but may have etherified or esterified hydroxyl groups, or may have halogen or carboxyl groups in place of the hydroxyl groups. Concrete examples of such polyethers are polyethylene oxide, polypropylene oxide, polytrimethylene oxide, polytetramethylene oxide, polypentamethylene oxide, polyhexamethylene oxide, polyheptamethylene oxide, polyoctamethylene oxide, polynonamethylene oxide, polydecamethylene oxide, and copolyethers comprising 2 or more of the above oxides in an optional proportion such as, for example, copoly. (propylene oxide-ethylene oxide), copoly. (tetramethylene oxide-ethylene oxide) and copoly. (tetramethylene oxide-tetraethylene oxide). These polyethers have processability-improving effects on thermoplastic elastomers comprising 1,3-butadiene and styrene and on thermoplastic elastomers lowered in processability by copolymerization with divinyl aromatic hydrocarbons.

As an additive which can greatly improve the processability of the thermoplastic elastomers obtained in accordance with the present process, without substantially deteriorating the physical properties thereof, a solid paraffin having a melting point of 35° to 160° C. is useful. In case the melting point of the solid paraffin added is below 35° C., the thermoplastic elastomer incorporated therewith is lowered in physical properties at room temperature, particularly in tensile strength, modulus and hardness. On the other hand, a solid paraffin having a melting point above 160° C. is slight in effect for improving the processability of the thermoplastic elastomer. When a solid paraffin having a melting point of 35° to 160° C. is added to the thermoplastic elastomer, the elastomer is excellent in fluidity at elevated temperature, shows favorable physical properties at room temperature, is scarcely lowered in tensile strength and is not substantially changed in modulus and hardness. When the thermoplastic elastomer is to be used at low temperatures, a solid paraffin relatively low in melting point is added, while when the thermoplastic elastomer is to be used at high temperatures, the addition of a solid paraffin relatively high in melting point is preferable. The amount of solid paraffin to be added is 1–1000 parts, preferably 5–50 parts, particularly preferably 10–30 parts, by weight per 100 parts by weight of the thermoplastic elastomer. In case the amount added is less than 1 part by weight, the processability-improving effect of solid paraffin is not substantially displayed, while in case the amount is more than 100 parts by weight, the elastomer is greatly deteriorated in physical properties, particularly in tensile strength and elongation, is lowered in elastic recovery and is increased in permanent set after stretching. Particularly when the solid paraffin is used in an amount of 5–50 parts, preferably 10–30 parts by weight, the processability improving effect thereof is sufficiently high and the lowering in physical properties of the elastomer can be depressed to a relatively slight extent. Since colorless solid paraffins of this kind are easily obtainable, products incorporated therewith are not stained. Further, due to the water repellency of the solid paraffins, products incorporated therewith are highly water-proof, in general. Moreover, the addition of solid paraffins increases the resistance of thermoplastic elastomers to light, oxygen and ozone, and advantageously displays the effects of preventing the elastomers from deterioration due to light, oxygen and ozone. Such solid paraffins may be used in admixture with an ordinary process oil or with the aforesaid polyether. The processability-improving effects of such solid paraffins are particularly marked in the cases of thermoplastic elastomers comprising 1,3-butadiene and styrene and those lowered in processability due to copolymerization with divinyl aromatic hydrocarbons.

As the additives for improving the processability of the present thermoplastic elastomers without changing the physical properties thereof, polyethylenes are also useful. The thermoplastic elastomers are highly miscible with polyethylenes to form homogeneous mixtures having excellent physical properties becoming to elastomers. It has been found that effective as such polyethylenes are those having a melt index [E] (ASTM D1238-57T, Condition E) of 1 to 1000, preferably 5 to 500. Such polyethylenes include so-called low pressure process polyethylenes and high pressure process polyethylenes, and their densities are in the range of from 0.92, in the case of high pressure process to 0.93–0.95 in the case of low pressure process. Polyethylenes ordinarily used for shaped articles have a melt index [E] of 0.1–60, and may be used in admixture with the present thermoplastic elastomers. However, as processability-improving agents, it is effective to use polyethylenes relatively high in melt index [E], i.e. those having a melt index [E] of 1–1000, preferably 5–500. In case a polyethylene having a melt index [E] less than 1 is used, no substantial processability-improving effect is observed. On the other hand, a polyethylene having a melt index of more than 1000 displays a high process-ability-improving effect, but a thermoplastic elastomer incorporated therewith is greatly deteriorated in physical properties, particularly in tensile strength, and the polyethylene blooms on the surface of the elastomer to bring about the so-called blooming phenomenon, whereby a shaped article made therefrom is lowered in commodity value. In contrast thereto, polyethylenes having a melt index [E] of 1–1000, preferably 5–500, are high in processability-improving effect when added to thermoplastic elastomers, and bring about no or little blooming phenomenon. The amount of polyethylene to be incorporated is in the range of 1–100 parts, preferably 5–70 parts, by weight per 100 parts by weight of thermoplastic elastomer. In case the amount is more than 100 parts by weight, the elastomer is lowered in elongation and elastic recovery, though the processability thereof is improved, while in case the amount is less than 1 part by weight, no substantial processability-improving effect is observed. A shaped article obtained from a polyethylene containing thermoplastic elastomer always has a smooth surface and maintains a beautiful surface skin. Since the polyethylenes are colorless, in general, thermoplastic elastomers incorporated therewith are not stained and hence may easily be colored to optional colors. Further, the polyethylene containing thermoplastic elastomers are increased in resistance against deterioration due to oxygen, ozone, ultraviolet light and heat. That is, when polyethylene is contained in an amount of 5–10 parts by weight per 100 parts by weight of thermoplastic elastomer, the deterioration-preventing effect is displayed, and the thermoplastic elastomer is increased in chemical resistance and enhanced in light resistance. Even when polyethylenes are incorporated in large amounts, no blooming phenomenon is observed unlike in the case of the aforesaid polyethers or solid paraffins. Such polyethylenes may be used in admixture with ordinary process oils or aforesaid polyethers or solid paraffins. When the polyethylenes are used in combination with such processability-improving agents, the blooming properties of said processability-improving agents can be greatly reduced. The processability-improving effects of such polyethylenes are particularly marked in the cases of thermoplastic elastomers comprising 1,3-butadiene and styrene, and those lowered in processability due to copolymerization with divinyl aromatic hydrocarbons.

The thermoplastic elastomers obtained according to the present process may be suitably cross-linked, after shaping, by use of a cross-linking agent ordinarily employed for the cross-linking of rubber, such as sulfur, sulfur dichloride or peroxide, so as to modify the modulus, thermal resistance and oil resistance of the shaped articles. Further, they may be contained with suitable amounts of stabilizers employed for preventing or reducing the deterioration of ordinary rubbers or plastics due to ultraviolet light, ozone, oxygen and heat. In addition, they may further be contained with suitable amounts of dyes or pigments employed to color ordinary rubbers and plastics. These stabilizers, dyes and pigments are selected so as to be suitable for the uses of the products. The above-mentioned blending agents such as process oils, plasticizers, fillers, stabilizers and coloring agents may be contained into the copolymer by first adding them to the final copolymer solutions or slurries and then removing the solvents, or may be blended by mechanical kneading using a roll mixer, Banbury mixer or the like.

The thermoplastic elastomers in accordance with the present process find their uses in a wide scope of fields where their excellent elasticity, processability, thermal resistance and oil resistance are utilized. For example, they are used for extrusion molded articles such as rubber yarns, hoses, pipes and sashes; injection molded articles such as footwears, containers and nipples, blow molded articles such as toys and household articles; and compression molded articles such as packings, sheets and plates. They are also useful as vibration-preventing materials by virtue of their excellent elasticity. Thus, the present thermoplastic elastomers can be used in various fields where vulcanizates of natural rubber or ordinary synthetic rubbers have been used, and can give, without necessitating any vulcanization step, various molded articles showing the same properties as those of the conventional vulcanized rubbers. The omission of the vulcanization step in the course of production of rubber articles is a marked advantage in obtaining the molded articles on commercial scale. Further, the thermoplastic elastomers according to the present process are particularly excellent in thermal resistance or both in thermal and oil resistance as compared with the conventional thermoplastic elastomers, and therefore their utility values in practical fields are greater.

Due to their thermoplasticity and their high solubility for hydrocarbon solvents, particularly for naphthenic and aromatic hydrocarbon solvents, the thermoplastic elastomers of the present invention are effectively used as adhesives either alone or in admixture with conventionally known adhesives or tackifiers and/or process oils. Generally, the present thermoplastic elastomers or their blends are high in adhesion strength as compared with the conventional thermoplastic elastomers having A-B-A type block arrangement and hence are more advantageously utilized as adhesives. As adhesives, they are successfully used for the adhesion between rubbers and rubbers, rubbers and metals, rubbers and wood, rubbers and plastics, rubbers and fibers, metals and metals, wood and wood, plastics and plastics, and fibers and fibers. Particularly strong adhesion strength can be attained by adhering the above materials under pressure at elevated temperatures utilizing the thermoplasticity of the present elastomers. It is needless to say that the present thermoplastic elastomers can also be used for the adhesion between the elastomers themselves and between the elastomers and rubbers, wood, plastics, metals, fibers or conventional thermoplastic elastomers.

Solutions of the thermoplastic elastomers of the present invention are used, with or without incorporation with a suitable pigment or dye, to decorate or protect the surfaces of materials by applying the solutions as paints or coating agents onto the material surfaces to form elastic coatings on said surfaces. Alternatively, the present elastomers may be used as paints or coating agents by adhering the elastomers under pressure onto the surfaces of materials to form elastic coatings, utilizing the thermoplasticity of the elastomers.

Further, latices prepared by dispersing in water the thermoplastic elastomers of the present invention may be used for the production of products which have conventionally been obtained by use of ordinary rubber latices, such as gloves, sheaths and rubber yarns, or may be used as binders, paints, coating agents and paper-sizing agents. Such latices are ordinarily obtained by adding water to a solution of the thermoplastic elastomer in a hydrocarbon solvent in presence of emulsifier reagent and vigorously stirring the solution to volatilize and remove a part or all of the hydrocarbon solvent.

The thermoplastic elastomers in accordance with the present process may be mixed with other rubbers to inhibit or reduce the fluidity of unvulcanized rubbers or unvulcanized rubber blends at room temperature (cold-flow) or to enhance the tensile strength of unvulcanized rubber blends (green strength). This property is ascribable to the fact that the present thermoplastic elastomers have properties of chemically cross-linked rubbers, show no fluidity at room temperature and are high in tensile strength. In the case of, for example, a polybutadiene rubber obtained by polymerization in the presence of a lithium base catalyst, the present elastomer is used in an amount of 1–50 parts, preferably 1–20 parts, by weight per 100 parts by weight of the rubber.

The thermoplastic elastomers of the present invention are also mixed with other plastics to modify the physical properties thereof, and are useful to impart elastic properties thereto and to enhance the impact resistance thereof. Such plastics include, for example, polystyrene, polyethylene, polypropylene, polyvinyl chloride, polyvinylidene chloride, vinyl chloridevinylidene chloride copolymer, polyacrylonitrile, acrylonitrile-acrylate ester copolymer, acrylonitrile-methacrylate ester copolymer, acrylonitrile-vinyl chloride copolymer, acrylonitrile-styrene copolymer, acrylonitrile-styrene-1,3-butadiene copolymer, polyvinyl acetate, ethylene-vinyl acetate copolymer, polymethylmethacrylate, polyoxymethylene, polycarbonates, polyamides, polyesters and polyurethanes.

Further, the thermoplastic elastomers of the present invention may be hydrogenated to partially or substantially completely saturate the conjugated diolefin portion or the monovinyl aromatic portion or both, thereby improving the light, oxidation and ozone resistance of the elastomers or modifying the physical properties thereof.

As mentioned above, the thermoplastic elastomers obtained in accordance with the present process are not only used independently but in admixture with various blending agents to modify the properties thereof or with other polymers to improve the properties of the polymers, and the present elastomers can be used in fields of a wide scope. It may be said that the significance of the present invention is extremely great in that the invention has facilitated the commercial scale production of such useful thermoplastic elastomers.

The modes of practice of the present invention will be illustrated below with reference to examples, but the examples are only illustrative and do not limit the scope of the present invention.

EXAMPLE 1

In a nitrogen atmosphere, 230 m mole as active lithium of n-butyllithium was added to a 15 wt.% n-hexane solution of 10 kg of a monomer mixture comprising 1,3-butadiene and styrene in a weight ratio of 50:50, and the mixture was polymerized at 55° C. for 4 hours. After more than 99% of the total monomers had been polymerized, the resulting active copolymer solution was further mixed with a 15 wt.% n-hexane solution containing a monomer mixture comprising 1,3-butadiene and styrene in a weight ratio of 65:35, and the mixture was polymerized at 70° C. for 5 hours. After more than 99% of the additional monomer mixture had been polymerized, the resulting final copolymer was contaminated with a small amount of water and was inactivated. To the copolymer solution, 250 g of phenyl-β-naphthylamine was added as a stabilizer and then n-hexane was volatilized to obtain a thermoplastic elastomer in accordance with the process of the present invention (Sample A). The sample A was pressed at an elevated temperature to form a dumbbell and the physical properties thereof were measured.

For comparison, a control sample B was prepared in the following manner: In a nitrogen atmosphere, 230 m mole as active lithium of n-butyllithium was added to a 15 wt.% toluene solution of 5 kg of styrene, and the mixture was polymerized at 45° C. for 4 hours. After more than 99% of the styrene had been polymerized, the resulting active polystyrene solution was mixed with a 15 wt.% toluene solution of 14.3 kg of 1,3-butadiene, and the mixture was polymerized at 55° C. for 3 hours. After substantially all of the 1,3-butadiene had been polymerized, the resulting active copolymer solution was mixed with a 15 wt.% toluene solution of 5 kg of styrene, and the mixture was further polymerized at 60° C. for 3 hours. After more than 99% of the styrene had been copolymerized, the resulting copolymer was inactivated by addition of a small amount of water. To the copolymer solution, 250 g of phenyl-β-naphthylamine was added and then toluene was volatilized to obtain a thermoplastic elastomer according to the known process (control sample B). The control B was pressed at an elevated temperature to form a dumbbell and the physical properties thereof were measured. Both the sample A according to the present process and the control sample B according to the known process had an equal styrene content of 41% by weight. The physical properties of the two samples were as shown in Table 1.

TABLE 1

| Item | Sample A | Sample B (control) | Test method |
|---|---|---|---|
| Tensile stress at 300% elongation (kg/cm$^2$) | 19 | 24 | ASTM D412-61T |
| Tensile strength (kg/cm$^2$) | 235 | 230 | " |
| Elongation (%) | 1020 | 1040 | " |
| Residual elongation (%) | 13 | 20 | Note (1) |
| Tear strength (kg/cm) | 38 | 35 | ASTM D624-54 |
| Hardness | 70 | 76 | ASTM D676-59T |

Note (1):
Ratio of the length of sample immediately after breaking due to stretching to the original length.

As shown in Table 1, the sample A in accordance with the present process is comparable in elastic properties to the control sample B according to the known process, and shows high tensile strength, sufficient elongation and favorable elastic recovery and tear strength.

Further, the sample A scarcely causes necking phenomenon when stretched. This is evidenced by the fact that when each sample was subjected to 500% elongation and was released from the tension and, immediately thereafter, the tensile stress thereof at 300% elongation was measured, the tensile stress of the sample A was 18 kg/cm$^2$ and was substantially the same as the initial value 19 kg/cm$^2$, whereas the tensile stress of the sample B was 17 kg/cm$^2$ and was greatly lower than the initial value 24 kg/cm$^2$.

Further, when the creep value (%) of each sample was measured by subjecting each dumbbell to a load of 2 kg/cm$^2$ at 100° C. for 10 minutes and representing the elongation thereof by percentage based on the original length (25 mm), the creep value of the sample A was 42%, whereas that of the sample B was 185%. Thus the sample A in accordance with the present process is difficulty creeped and is excellent in thermal resistance as compared with the sample B in accordance with the conventional process.

100 parts by weight of the sample A was mixed with 20 parts by weight of finely divided silicic anhydride by means of an open roll to prepared a sample A'. The sample A' was compared in physical properties with the original sample A to obtain the results as set forth in Table 2, in which the test methods are the same as in Table 1.

TABLE 2

| Item | Sample A' | Sample A |
|---|---|---|
| Tensile stress at 300% elongation (kg/cm$^2$) | 41 | 19 |
| Tensile strength (kg/cm$^2$) | 225 | 235 |
| Elongation (%) | 960 | 1020 |
| Residual elongation (%) | 16 | 13 |
| Tear strength (kg/cm) | 39 | 38 |
| Hardness | 78 | 70 |

As shown in Table 2, the addition of finely divided silicic anhydride makes it possible to enhance the tensile stress at 300% elongation and hardness of the sample A without substantially changing the tensile strength, tear strength and elongation thereof.

Further, 100 parts by weight of the sample A was mixed by means of an open roll with 20 parts by weight of a paraffinic process oil having a specific gravity of 0.8701 and a viscosity-gravity constant of 0.8522 to prepare a sample A''. The sample A'' was compared in physical properties with the original sample A to obtain the results as set out in Table 3, in which the test methods are the same as in the case of Table 1.

TABLE 3

| Item | Sample A'' | Sample A |
|---|---|---|
| Tensile stress at 300% elongation (kg/cm$^2$) | 14 | 19 |
| Tensile strength (kg/cm$^2$) | 185 | 235 |
| Elongation (%) | 1200 | 1020 |
| Residual elongation (%) | 20 | 13 |
| Tear strength (kg/cm) | 32 | 38 |
| Hardness | 39 | 70 |

As shown in Table 3, the incorporation of a paraffinic process oil makes it possible to control the hardness of the sample A without substantially changing the properties of elastomer.

Next, a thermoplastic elastomer C according to the conventional process which has the same hardness as that of the sample A of the present invention was prepared in the following manner:

In a nitrogen atmosphere, 3.65 kg of styrene was polymerized in toluene using 230 m mole of n-butyllithium as a polymerization initiator. The resulting polymer was copolymerized with 7.0 kg of 1,3-butadiene and then with 3.65 kg of styrene. The final copolymer was inactivated by addition of a small amount of water. To the copolymer solution, 250 g of phenyl-β-naphthylamine was added and then toluene was volatilized to obtain a thermoplastic elastomer having a styrene content of 30% by weight (sample C). The sample C was pressed at an elevated temperature to prepare a dumbbell, and physical properties thereof were measured. The results are shown in Table 4 in comparison with the physical properties of the sample A. In the table, the test methods are the same as in Table 1.

TABLE 4

| Item | Sample A | Sample C (control) |
|---|---|---|
| Tensile stress at 300% elongation (kg/cm$^2$) | 19 | 21 |
| Tensile strength (kg/cm$^2$) | 235 | 205 |
| Elongation (%) | 1020 | 960 |
| Residual elongation (%) | 13 | 15 |
| Tear strength (kg/cm) | 38 | 35 |
| Hardness | 70 | 70 |

As shown in Table 4, the sample A in accordance with the present process is comparable in physical properties to the sample C according to the conventional process which has the same hardness as that of the sample A.

In order to compare the sample A according to the present process with the sample B in accordance with the conventional process in adhesion strength to an iron sheet having a smoothly abraded surface, a sheet of each sample was adhered onto the iron sheet at 180° C. for 5 minutes under a pressure of 100 kg/cm$^2$ and the adhesion strength[1] thereof (tack) against peeling was measured according to JIS K-6301. As the result, the sample A showed an adhesion strength of 10 kg/cm, while the sample B 4 kg/cm, and thus the former was greater in adhesion strength than the latter. On the other hand, a solution of 25 parts by weight of each sample in 75 parts by weight of toluene was applied onto an iron sheet and was air-dried at 30° C. for 30 minutes. On the resulting coating with a thickness of 0.2 mm, another iron sheet was placed and was adhered thereto at 30° C. for 10 minutes under a pressure of 5 kg/cm$^2$ to measure the shear cohesive strength[2] thereof. As the result, the sample A showed a strength of 11.0 kg/cm$^2$ while the sample B 4.5 kg/cm$^2$, and thus the former was greater in shear cohesive strength than the latter.

Note (1): Adhesion width: 25 mm, extension rate: 25 mm/min. (2): Cohesion width: 25 mm, cohesion length: 25 mm, extension rate: 25 mm/min.

EXAMPLE 2

In a nitrogen atmosphere, 213 m mole as active lithium of n-butyllithium was added to a 15 wt.% n-hexane solution of a mixture of 9.5 kg of a monomer mixture comprising 1,3-butadiene and styrene in a weight ratio of 40:60 and 0.0750 part by weight based on 100 parts by weight of said mixture of m-divinylbenzene, and the mixture was polymerized at 60° C. for 4 hours. After more than 99% of the monomers had been copolymerized, the resulting active copolymer solution was mixed with a 20 wt.% n-hexane solution of 19.0 kg of a monomer mixture comprising 1,3-butadiene and styrene in a weight ratio of 70:30 and 0.0375 part by weight per 100 parts by weight of said mixture of m-divinylbenzene, and the mixture was polymerized first at 70° C. for 4 hours and then at 85° C. for additional one hour. After substantially all of the additional monomer mixture had been polymerized, the resulting final copolymer was inactivated by addition of a small amount of water. To the copolymer solution, 285 g of phenyl-β-naphthylamine was added as a stabilizer. Thereafter, n-hexane was volatilized to obtain a thermoplastic elastomer according to the present process (sample D), and the physical properties of the sample D were measured.

For comparison, a sample E according to the conventional process was prepared in the following procedure:

In a nitrogen atmosphere, 213 m mole as active lithium of n-butyllithium was added to a 15 wt.% toluene solution of 5.7 kg of styrene, and the mixture was polymerized at 45° C. for 4 hours. After more than 99% of styrene had been polymerized, the resulting active polystyrene solution was mixed with a 15 wt.% toluene solution of 17.1 kg of 1,3-butadiene, and the mixture was polymerized at 55° C. for 3 hours. After substantially all of the 1,3-butadiene had been copolymerized, the resulting active copolymer solution with a 15 wt.% toluene solution of 5.7 kg of styrene, and the mixture was polymerized at 60° C. for 3 hours. After substantially all of the styrene had been copolymerized, the resulting final copolymer was inactivated by addition of a small amount of water. To the copolymer solution, 250 g of phenyl-β-naphthylamine was added as a stabilizer. Thereafter, toluene was volatilized to obtain a thermoplastic elastomer according to the conventional process (sample E), and the physical properties of the sample F were measured. Both the sample D and the sample E had an equal styrene content of 40% by weight based on the total amount of 1,3-butadiene and styrene. The physical properties of the two samples are shown in Table 5.

TABLE 5

| Item | Sample D | Sample E (control) | Test Method |
|---|---|---|---|
| Tensile stress at 300% elongation (kg/cm$^2$) | 36 | 25 | ASTM D412-61T |
| Tensile strength (kg/cm$^2$) | 204 | 240 | " |
| Elongation (%) | 880 | 1060 | " |
| Residual elongation (%) | 8 | 14 | Note (1) |
| Tear strength (kg/cm) | 42 | 38 | ASTM D624-54 |
| Hardness | 79 | 78 | ASTM D676-59T |
| Melt index (condition G) | 0.10 | 0.15 | ASTM D1238-57T |
| Creep value (%) | 30 | 250 | Note (2) |
| Swelling degree (%) | 32 | 112 | Note (3) |

Note
(1): According to the test method in Table 1.
(2): Ratio of the elongated sample to the original length (25 mm) after creeping the sample at 60° C. for 5 minutes under a load of 10 kg/cm$^2$.
(3): Percentage of weight increase, based on the original weight, of a sample due to swelling by immersing the sample with a length of 2 cm, a width of 2 cm and a thickness of 2 mm in No. 3 oil designated by ASTM D471-57T at 20° C. for 24 hours.

As is clear from Table 5, the sample D according to the present process is somewhat low, as compared with the sample E according to the conventional process, in tensile strength and melt index, but is low in creep value at 60° C. and excellent in thermal resistance, is low in swelling degree due to oil and excellent in oil resistance, is great in tensile stress at 300% elongation and is small in residual elongation.

Next, 100 parts by weight of the sample D in accordance with the present process was mixed with 30 parts by weight of a solid paraffin having a melting point of 63° C. and 20 parts by weight of finely divided silicic anhydride, and the mixture was kneaded on an open roll at 130° C. to obtain a sample D'. The physical properties of the sample D' were as shown in Table 6, in which the test methods are the same as in Table 5.

TABLE 6

| Item | Sample D' |
| --- | --- |
| Tensile stress at 300% elongation (kg/cm$^2$) | 32 |
| Tensile strength (kg/cm$^2$) | 205 |
| Elongation (%) | 960 |
| Residual elongation (%) | 12 |
| Tear strength (kg/cm) | 38 |
| Hardness | 80 |
| Melt index (condition G) | 1.84 |
| Creep value (%) | 40 |
| Swelling degree (%) | 42 |

As shown in Table 6, the sample D', prepared by adding to the sample D according the present process suitable amounts of solid paraffin and finely divided silicic anhydride, is high in melt index and thus favorable in processability, despite the fact that it is high in thermal resistance and oil resistance as compared with the sample E obtained according to the conventional process.

EXAMPLE 3

In a nitrogen atmosphere, 213 m mole as active lithium of sec-butyllithium was added to a 15 wt.% n-hexane solution of 9.5 kg of a monomer mixture comprising 1,3-butadiene and styrene in a weight ratio of 40:60, and the mixture was polymerized at 60° C. for 4 hours. After more than 99% of the monomers had been polymerized, the resulting active copolymer solution was mixed with a 20 wt.% n-hexane solution of a mixture of 19.0 kg of a monomer mixture comprising 1,3-butadiene and styrene in a weight ratio of 70:30 and 0.0500 part by weight based on 100 parts by weight of said mixture of divinylbenzene (a 80:20 mixture of m- and p-divinylbenzenes), and the mixture was polymerized first at 70° C. for 4 hours and then at 85° C. for one hour. After substantially all of the additional monomer mixture had been copolymerized, the resulting final copolymer was inactivated by addition of a small amount of water. To the copolymer, 285 g of phenyl-β-naphthylamine was added as a stabilizer. Thereafter, n-hexane was volatilized to obtain a thermoplastic elastomer in accordance with the present process (sample F), and the physical properties of the samples F were measured.

Further, in a nitrogen atmosphere, 213 m mole as active lithium of sec-butyllithium was added to a 15 wt.% n-hexane solution of a mixture of 9.5 kg of a monomer mixture comprising 1,3-butadiene and styrene in a weight ratio of 40:60 and 0.1000 part by weight based on 100 parts by weight of said mixture of the aforesaid divinylbenzene, and the mixture was polymerized at 60° C. for 4 hours. After more than 99% of the monomers and been polymerized, the resulting active copolymer solution was further mixed with a 20 wt.% n-hexane solution of 19.0 kg of a monomer mixture comprising 1,3-butadiene and styrene in a weight ratio of 70:30, and the mixture was polymerized first at 70° C. for 4 hours and then at 85° C. for one hour. After substantially all of the additional monomer mixture had been copolymerized, the resulting final copolymer was inactivated by addition of a small amount of water. To the copolymer solution, 285 g of phenyl-β-naphthylamine was added. Thereafter, n-hexane was volatilized to obtain a thermoplastic elastomer in accordance with the present process (sample G), and the physical properties of the sample G were measured.

Still further, in a nitrogen atmosphere, 213 m mole as active lithium of sec-butyllithium was added to a 15 wt.% n-hexane solution of 9.5 kg of a monomer mixture comprising 1,3-butadiene and styrene in a weight ratio of 40:60, and the mixture was polymerized at 60° C. for 4 hours. After more than 99% of the monomers had been polymerized, the resulting active copolymer solution was further mixed with a 20 wt.% n-hexane solution of 19.0 kg of a monomer mixture comprising 1,3-butadiene and styrene in a weight ratio of 70:30, and the mixture was polymerized first at 70° C. for 4 hours and then at 85° C. for one hour. After substantially all of the monomer mixture had been copolymerized, the resulting final copolymer was inactivated by addition of a small amount of water. To the copolymer solution, 285 g of phenyl-β-naphthylamine was added. Thereafter, n-hexane was volatilized to obtain a non-divinylbenzene-incorporated thermoplastic elastomer in accordance with the present process (sample H), and the physical properties thereof were measured.

The samples F, G and H in accordance with the present process had an equal styrene content of 40% by weight based on the total amount of 1,3-butadiene and styrene. The physical properties of these samples were as shown in Table 7, in which the test methods are the same as in Table 5.

TABLE 7

| Item | Sample F | Sample G | Sample H |
| --- | --- | --- | --- |
| Tensile stress at 300% elongation (kg/cm$^2$) | 29 | 28 | 22 |
| Tensile strength (kg/cm$^2$) | 226 | 218 | 247 |
| Elongation (%) | 950 | 940 | 1100 |
| Residual elongation (%) | 13 | 12 | 20 |
| Tear strength (kg/cm) | 43 | 44 | 41 |
| Hardness | 78 | 78 | 77 |
| Melt index (condition G) | 0.07 | 0.06 | 0.10 |
| Creep value (%) | 64 | 60 | 160 |
| Swelling degree (%) | 48 | 47 | 88 |

As is clear from Table 7, the sample G prepared by adding a small amount of divinylbenzene only to the initially polymerized monomer mixture and the sample F prepared by adding a small amount of divinylbenzene only to the additionally copolymerized monomer mixture are, as compared with the sample H prepared without the addition of divinylbenzene, somewhat low in tensile strength and melt index but are low in creep value and thus excellent in thermal resistance, are low in degree of swelling due to oil and thus favorable in oil resistance, are great in tensile stress at 300% elongation and low in residual elongation.

Next, 100 parts by weight of the sample H was homogeneously mixed on an open roll at 110° C. with each 10 parts by weight of low density polyethylenes having a melt index of 10 (density: 0.925), 100 (density: 0.922) and 200 l (density: 0.920), respectively, to obtain polyethylene blends H', H" and H'" having a melt index of 10, 100 and 200, respectively, and the physical properties of respective blends were measured.

For comparison, 100 parts by weight of the sample H was homogeneously mixed on an open roll at 110° C. with each 10 parts by weight of a paraffinic process oil (specific gravity: 0.8701, V.G.C.: 0.8122), a naphthenic process oil (specific gravity: 0.8956, V.G.C.: 0.8662) and an aromatic process oil (specific gravity: 0.9825, V.G.C.: 0.9330), to obtain a paraffinic process oil blend $H_1$, a naphthenic process oil blend $H_2$ and an aromatic process oil blend $H_3$, and the physical properties of respective blends were measured.

The physical properties of the thus obtained samples are shown in Table 8, in which the test methods are the same as in Table 8.

TABLE 8

| Item | Samples | | | | | | |
|---|---|---|---|---|---|---|---|
| | H | H' | H'' | H''' | $H_1$ | $H_2$ | $H_3$ |
| Tensile stress at 300% elongation (kg/cm$^2$) | 22 | 28 | 26 | 25 | 20 | 17 | 14 |
| Tensile strength (kg/cm$^2$) | 247 | 252 | 240 | 235 | 195 | 183 | 160 |
| Elongation (%) | 1100 | 1160 | 1180 | 1240 | 1120 | 1260 | 1300 |
| Tear strength (kg/cm) | 41 | 40 | 41 | 42 | 35 | 36 | 37 |
| Hardness | 77 | 80 | 77 | 76 | 60 | 62 | 67 |
| Melt index (condition G) | 0.10 | 0.60 | 0.92 | 1.52 | 0.52 | 0.40 | 0.37 |

As is clear from Table 8, the polyethylene-blended samples H', H'' and H''' are same or higher in melt index (condition G) and are more excellent in tensile stress at 300% elongation and tensile strength than the samples $H_1$, $H_2$ and $H_3$ extended, respectively, with paraffinic, naphthenic and aromatic process oils in a proportion equal to that of polyethylenes incorporated in said samples H', H'' and H''', and are substantially the same in hardness as the non-polyethylene blended sample H. From this, it is clear that polyethylenes having a suitable melt index have favorable processability improving effects on the thermoplastic elastomers in accordance with the present process, without substantially lowering the physical properties thereof.

Next, 100 parts by weight of the sample G was homogeneously mixed on an open roll at 145° C. with 10 parts and 30 parts by weight, respectively, of a high density polyethylene having a melt index (condition E) of 20 and a density of 0.9470 to obtain samples G' and G'' blended, respectively, with 10 parts and 30 parts by weight of polyethylene, and the physical properties of respective samples were measured.

For comparison, 100 parts by weight of the sample G was homogeneously mixed on an open roll at 110° C. with 10 parts and 30 parts by weight, respectively, of a paraffinic process oil (specific gravity: 0.8701, V.G.C.: 0.8122) to obtain samples $G_1$ and $G_2$ extended, respectively, with 10 parts and 30 parts by weight of paraffinic process oil, and the physical properties of respective samples were measured. The physical properties of the thus obtained samples are shown in Table 9, in which the test methods are the same as in Table 5.

TABLE 9

| Item | Samples | | | | |
|---|---|---|---|---|---|
| | G | G' | G'' | $G_1$ | $G_2$ |
| Tensile stress at 300% elongation (kg/cm$^2$) | 28 | 35 | 40 | 22 | 15 |
| Tensile strength (kg/cm$^2$) | 218 | 224 | 226 | 170 | 110 |
| Elongation (%) | 940 | 1000 | 1080 | 920 | 1150 |
| Residual elongation (%) | 12 | 15 | 30 | 16 | 36 |
| Tear strength (kg/cm) | 43 | 42 | 39 | 37 | 26 |
| Hardness | 78 | 82 | 83 | 65 | 40 |
| Melt index (condition G) | 0.07 | 0.62 | 0.95 | 0.50 | 2.89 |

As known from Table 9, the polyethylene blended samples G' and G'' are somewhat low in melt index (condition G) but are far great in tensile stress at 300% elongation and tensile strength, are low in residual elongation and thus excellent in elastic recovery, and are high in hardness, as compared with the samples $G_1$ and $G_2$ extended with paraffinic process oil in a proportion equal to that of polyethylene blended in said samples G' and G''. Further, the samples G' and G'' are rather greater in hardness than the non-blended sample G.

Next, each dumpbell of the sample G and the polyethylene blended sample G' was exposed outdoors to sunlight and the variation of each sample in tensile strength due to days of exposure was observed. The results are shown in Table 10.

TABLE 10

| | Variation in tensile strength (kg/cm$^2$) due to days of exposure to sunlight | | | | |
|---|---|---|---|---|---|
| | Days of exposure | | | | |
| Sample | 0 | 2 | 5 | 10 | 15 |
| G | 218 | 150 | 37 | 26 | 20 |
| G' | 224 | 180 | 92 | 75 | 60 |

As is clear from Table 1, the polyethylene-blended sample G' is smaller than the non-blended sample G in tensile strength lowering due to exposure to sunlight and hence is more excellent in light resistance. From this, it is understood that the blending of polyethylene into the thermoplastic elastomers of the present invention effectively improves the elastomers not only in processability but also in light resistance.

Next, 100 parts by weight of the sample F was mixed on an open roll at 130° C. respectively with 5 parts by weight of a polypropylene oxide having a molecular weight of 2,000 (both thermal are hydroxyl groups), 15 parts by weight of a solid paraffin having a melting point of 75° C., and 15 parts by weight of a paraffinic process oil (specific gravity: 0.871, V.G.C.: 0.8122) to obtain a polypropylene oxide contained sample F', a solid paraffin blended sample F'' and a paraffinic processing oil extended sample $F_1$. The physical properties of these samples F' and F'' and $F_1$ are shown in Table 11 together with those of the sample F.

TABLE 11

| Item | Samples | | | |
|---|---|---|---|---|
| | F | F' | F'' | $F_1$ |
| Tensile stress at 300% elongation (kg/cm$^2$) | 29 | 26 | 23 | 14 |
| Tensile strength (kg/cm$^2$) | 226 | 210 | 192 | 137 |
| Elongation (%) | 950 | 1000 | 1020 | 980 | other hand, 100 parts by weight of the sample F was blended with 20 parts by weight of said low density polyethylene and with 20 parts by weight of said paraffinic process. oil to prepare a sample $F_2$. These samples F''' and $F_2$ were compred with the samples F'' and $F_1$ in blooming property [represented herein by the weight (g) of each blending agent bloomed per day per m$^2$ of the surface area of each sample]. The results are shown in Table 12.

TABLE 12

| Item | Samples | | | |
|---|---|---|---|---|
| | F'' | F''' | $F_1$ | $F_2$ |
| Amount of blended polyethylene | 0 | 20 | 0 | 20 |
| Amount of extended paraffinic process oil | 0 | 0 | 20 | 20 |
| Amount of blended solid paraffin | 20 | 20 | 0 | 0 |
| Blooming (g/m$^2$/day) | 0.50 | 0.11 | 0.04 | 0 |

As is clear from Table 12, the sample F''' prepared by blending the sample F with polyethylene and solid paraffin is lower in blooming property than the sample F'' prepared by blending the sample F only with solid paraffin. Further, the sample $F_2$ prepared by blending the sample F with polyethylene and paraffinic process oil is lower in blooming property than the sample $F_1$ prepared by extending the sample F only with paraffinic process oil.

EXAMPLE 4

In a nitrogen atmosphere, 328 m mole as active lithium of sec-butyllithium was added to a 15 wt.% n-hexane solution of 10 kg of a monomer mixture containing isoprene and styrene in a weight ratio of 40:60, and the mixture was polymerized at 60° C. for 4 hours. After more than 99% of the total monomers had been polymerized, the resulting active copolymer solution was further mixed with a 15 wt.% n-hexane solution of 20 kg of a monomer mixture comprising isoprene and styrene in a weight ratio of 70:30, and the mixture was polymerized at 70° C. for 5 hours. After substantially all of the additional monomer mixture had been copolymerized, the resulting final copolymer was inactivated by addition of a small amount of water. To the copolymer solution, 300 g of phenyl-β-naphthylamine was added as a stabilizer. Thereafter, n-hexane was volatilized to obtain a thermoplastic elastomer in accordance with the present process (sample I), and the physical properties of the sample I were measured.

Further, in a nitrogen atmosphere, 328 m mole as active lithium of sec-butyllithium was added to a 15 wt.% n-hexane solution of a mixture of 10 kg of a monomer mixture comprising isoprene and styrene in a weight ratio of 40:60 and 0.0750 part by weight per 100 parts by weight of said monomer mixture of divinylbenzene (a 80:20 mixture of m- and p-divinylbenzenes, the same shall apply hereinafter), and the mixture was polymerized at 60° C. for 4 hours. After more than 99% of the total monomers had been polymerized, the resulting copolymer solution was further mixed with a 20 wt.% n-hexane solution of a mixture of 20 kg of a monomer mixture comprising isoprene and styrene in a weight ratio of 70:30 and 0.0375 part by weight per 100 parts by weight of said monomer mixture of divinylbenzene, and the mixture was polymerized at 70° C. for 5 hours. After substantially all of the additional monomer mixture had been copolymerized, the resulting final copolymer was inactivated by addition of a small amount of water. To the copolymer solution, 300 g of phenyl-β-naphthylamine was added. Thereafter, n-hexane was volatilized to obtain a thermoplastic elastomer in accordance with the present process (sample J) and the physical properties thereof were measured.

Still further, in nitrogen atmosphere, 328 m mole as active lithium of sec-butyllithium was added to a 15 wt.% n-hexane solution of a mixture of 10 kg of a monomer mixture comprising isoprene and styrene in a weight ratio of 40:60 and 0.150 part by weight per 100 parts by weight of said monomer mixture of divinylnaphthalene (a 90:10 mixture of 1,3- and 1,2-divinylnaphthalenes), and the mixture was polymerized at 60° C. for 4 hours. After more than 99% of the total monomers had been polymerized, the resulting active copolymer solution was further mixed with a 20 wt.% n-hexane solution of a mixture of 20 kg of a monomer mixture comprising isoprene and styrene in a weight ratio of 70:30 and 0.100 part by weight per 100 parts by weight of said monomer mixture of said divinylnaphthalene, and the mixture was polymerized at 70° C. for 5 hours. After substantially all of the additional monomer mixture had been copolymerized, the resulting final copolymer was inactivated by addition of a small amount of water. To the copolymer solution, 300 g of phenyl-β-naphthylamine was added. Thereafter, n-hexane was volatilized to obtain a thermoplastic elastomer in accordance with the present process (sample K), and the physical properties thereof were measured.

For comparison, a sample L was prepared in the following procedure: In nitrogen atmosphere, 328 m mole as active lithium of sec-butyllithium was added to a 15 wt.% toluene solution of 6 kg of styrene, and the mixture was polymerized at 45° C. for 4 hours. After more than 99% of the styrene had been polymerized, the resulting active polystyrene solution was mixed with a 15 wt.% toluene solution of 18 kg of isoprene, and the mixture was polymerized at 55° C. for 3 hours. After substantially all of the isoprene had been copolymerized, the resulting active copolymer solution was further mixed with a 15 wt.% toluene solution of 6 kg of styrene, and the mixture was further polymerized at 60° C. for 3 hours. After substantially all of the styrene had been copolymerized. the resulting final copolymer was inactivated by addition of a small amount of water. To the copolymer solution, 300 g of phenyl-β-naphthylamine was added. Thereafter, toluene was volatilized to obtain a thermoplastic elastomer in accordance with the conventional process (sample L), and physical properties thereof were measured.

For further comparison, a sample M was prepared in the following manner: In nitrogen atmosphere, 656 m mole as active lithium of 1,2-dilithio-1,2-diphenylethane was added to a n-hexane solution of 18 kg of isoprene, and the mixture was polymerized at 56° C. for 5 hours. After more than 99% of the isoprene had been polymerized, the resulting active polyisoprene solution was mixed with a 15 wt.% n-hexane solution of 12 kg of styrene, and the mixture was further polymerized at 60° C. for 3 hours. After substantially all of the styrene had been copolymerized, the resulting final copolymer was inactivated by addition of a small amount of water. To the copolymer solution, 300 g of phenyl-β-naphthylamine was added. Thereafter, n-hexane was volatilized to obtain a thermoplastic elastomer in accordance with the conventional process (sample M), and the physical properties thereof were measured.

All the samples I, J and K in accordance with the present process and the samples L and M in accordance with the conventional process had an equal styrene content of 40% by weight based on the total amount of isoprene and styrene. The physical properties of these samples are shown in Table 13, in which the test methods are the same as in Table 5.

TABLE 13

| Item | I | J | K | L (control) | N (control) |
|---|---|---|---|---|---|
| Tensile stress at 300% elongation (kg/cm²) | 23 | 38 | 37 | 25 | 24 |
| Tensile strength (kg/cm²) | 193 | 180 | 175 | 192 | 185 |
| Elongation (%) | 960 | 860 | 840 | 1030 | 1000 |

TABLE 13-continued

| Item | I | J | K | L (control) | N (control) |
|---|---|---|---|---|---|
| Residual elongation (%) | 20 | 6 | 7 | 26 | 41 |
| Tear strength (kg/cm) | 43 | 45 | 44 | 39 | 38 |
| Hardness | 73 | 73 | 73 | 77 | 77 |
| Melt index (condition G) | 1.41 | 0.90 | 0.84 | 2.28 | 2.30 |
| Creep value (%) | 180 | 35 | 40 | 310 | 370 |
| Swelling degree (%) | 110 | 23 | 28 | 130 | 150 |
| Necking phenomenon | Slightly observed | Scarcely observed | Scarcely observed | Observed | Observed |

As is clear from Table 13, the samples I, J and K in accordance with the present process are, as compared with the sampls L and M in accordance with the conventional process, high in tensile strength and tear strength, are small in creep value and thus excellent in thermal resistance, and scarcely bring about the necking phenomenon. Further, the divinylbenzene contained sample J and the divinylnaphthalene contained sample K are, as compared with the sample I and the samples L and M according to the conventional process, more or less low in melt index but are small in creep value and thus excellent in thermal resistance, and are low in degree of swelling due to oil and thus favorable in oil resistance.

EXAMPLE 5

In nitrogen atmosphere, 225 m mole as active lithium of n-butyllithium was added to a 15 wt.% n-hexane solution of 10 kg of a monomer mixture comprising 1,3-butadiene, isoprene and styrene in a weight ratio of 30:20:50, and the mixture was polymerized at 60° C. for 4 hours. After more than 99% of the total monomers had been polymerized, the resulting active copolymer solution was further mixed with a 15 wt.% n-hexane solution of 10 kg of a monomer mixture comprising 1,3-butadiene, isoprene and styrene in a weight ratio of 20:30:50, and the mixture was polymerized at 70° C. for 4 hours. After substantially all of the additional monomer mixture had been compolymerized, the resulting final copolymer was inactivated by addition of a small amount of water. To the copolymer solution, 200 g of di-tert-butyl-p-cresol was added as a stabilizer. Thereafter, n-hexane was volatilized to obtain a thermoplastic elastomer in accordance with the present process (sample N), and the physical properties thereof were measured.

Further, in nitrogen atmosphere, 225 m mole as active lithium of n-butyllithium was added to a 15 wt.% n-hexane solution of a mixture of 10 kg of a monomer mixture comprising 1,3-butadiene, isoprene and styrene in a weight ratio of 30:20:50 and 0.1000 part by weight per 100 parts by weight of said monomer mixture divinylbenzene (a 80:20 mixture of m- and p-divinylbenzenes), and the mixture was polymerized at 60° C. for 4 hours. After more than 99% of the total monomers had been polymerized, the resulting active copolymer solution was further mixed with a 15 wt.% n-hexane solution of a mixture of 10 kg of a monomer mixture comprising 1,3-butadiene, isoprene and styrene in a weight ratio of 20:30:50 and 0.1000 part by weight per 100 parts by weight of said monomer mixture of divinylbenzene, and the mixture was polymerized at 70° C. for 4 hours. After substantially all of the additional monomer mixture had been copolymerized, the resulting final copolymer was inactivated by addition of a small amount of water. To the copolymer solution, 200 g of di-tert-butyl-p-cresol was added. Thereafter, n-hexane was volatilized to obtain a thermoplastic elastomer in accordance with the present process (sample O), and the physical properties thereof were measured.

For comparison, a sample P was prepared in the following manner: In nitrogen atmosphere, 450 m mole as active lithium of n-butyllithium was added to a 15 wt.% cyclohexane solution of 10 kg of styrene, and the mixture was polymerized at 45° C. for 4 hours. After more than 99% of the styrene had been polymerized, the resulting active polystyrene solution was mixed with a 15 wt.%

| Tear strength (kg/cm) | 43 | 40 | 42 | 39 |
|---|---|---|---|---|
| Hardness | 78 | 73 | 77 | 54 |
| Melt index (condition G) | 0.07 | 1.53 | 1.32 | 1.25 |

From the results of Table 11, it is understood that the sample F' prepared by blending 100 parts by weight of the sample F with 5 parts by weight of polypropylene oxide does not substantially differ from the non-blended sample F, except that the former is somewhat lower in tensile strength and hardness, and is higher in melt index which is a standard for processability and hence is excellent in processability. The sample F" prepared by blending 100 parts by weight of the sample F with 20 parts by weight of solid paraffin does not substantially differ in physical properties from the sample F, except that the former is somewhat lower in tensile strength, and is higher in melt index and thus excellent in processability. It is also understood that the samples F' and F" are substantially equal in melt index to the sample $F_1$ prepared by blending 100 parts of the sample F with 20 parts by weight of paraffinic process oil, but far more excellent than the sample $F_1$ in tensile stress at 300% elongation, tensile strength and tear strength.

Further, 100 parts by weight of the sample F was blended with 20 parts by weight of a low density polyethylene having a melt index (condition E) of 20 and a density of 0.925 and with 20 parts by weight of the aforesaid solid paraffin to prepare a sample F'''. On the cyclohexane solution of 10 kg of a monomer mixture comprising 1,3-butadiene and isoprene in a weight ratio of 50:50, and the mixture was polymerized at 55° C. for 3 hours. After substantially all of the additional monomer mixture had been copolymerized, the resulting active copolymer solution was mixed with 225 m mole of 1,4-dibromobutene and the mixture was subjected to coupling reaction at 55° C. for 3 hours. The resulting final copolymer was inactivated by addition of a small amount of water. To the copolymer solution, 200 g of di-tert-butyl-p-cresol was added. Thereafter, cyclohexane was volatilized to obtain a thremoplastic elastomer in accordance with the conventional process (sample P), and the physical properties thereof were measured.

All the samples N and O in accordance with the present process and the sample P in accordance with the conventional process had an equal styrene content of 50% by weight based on the total amount of 1,3-butadiene, isoprene and styrene. The physical properties of these samples are shown in Table 14, in which the test methods are the same as in Table 5.

TABLE 14

| Item | Samples | | |
|---|---|---|---|
| | N | O | P (control) |
| Tensile stress at 300% elongation (kg/cm²) | 38 | 42 | 39 |
| Tensile strength (kg/cm²) | 210 | 190 | 175 |
| Elongation (%) | 1020 | 940 | 1000 |
| Residual elongation (%) | 27 | 8 | 60 |
| Tear strength (kg/cm) | 42 | 41 | 40 |
| Hardness | 80 | 80 | 83 |
| Melt index (condition G) | 2.34 | 0.84 | 2.43 |
| Creep value (%) | 170 | 30 | 280 |
| Swelling degree (%) | 120 | 19 | 130 |
| Necking phenomenon | Scarcely observed | Not observed | Observed |

As shown in Table 14, the samples N and O in accordance with the present process are, as compared with the sample P in accordance with the conventional process, high in tensile strength and tear strength, are small in creep value and excellent in thermal resistance, and scarcely bring about the necking phenomenon. Further, the divinylbenzene contained sample O is, as compared with the sample N and the sample P in accordance with the conventional process, low in melt index but is small in creep value and thus excellent in thermal resistance, and is low in degree of swelling due to oil and thus excellent in oil resistance.

EXAMPLE 6

In a nitrogen atmosphere, 300 m mole as active lithium of n-butyllithium was added to a 15 wt.% cyclohexane solution of 10 kg of a monomer mixture comprising 1,3-butadiene and p-methylstyrene in a weight ratio of 50:50, and the mixture was polymerized at 60° C. for 4 hours. After more than 99% of the total monomers had ben polymerized, the resulting active copolymer solution was further mixed with a 15 wt.% cyclohexane solution of 23.3 kg of a monomer mixture comprising 1,3-butadiene and p-methylstyrene in a weight ratio of 78.5:21.5, and the mixture was polymerized first at 60° C. for 3 hours and then at 70° C. for 3 hours. After substantially all of the additional monomer mixture had been copolymerized, the resulting final copolymer was inactivated by addition of a small amount of water. To the copolymer solution, 333 g of di-tert-butyl-p-cresol was added as a stabilizer. Therefater, cyclohexane was volatilized to obtain a thermpolastic elastomer in accordance with the present process (sample Q), and the physical properties thereof were measured.

For comparison, a sample R was prepared in the following procedure: 600 m mole as active lithium of 1,2-dilithio-1,2-diphenylethane calculated was added to a cyclohexane solution of 33.3 kg of monomer mixture comprising 1,3-butadiene and p-methylstyrene in a weight ratio of 70:30, and the mixture was polymerized first at 55° C. for 5 hours and then at 60° C. for 3 hours. After substantially all of the monomer mixture had been copolymerized, the resulting final copolymer was inactivated by addition of a small amount of water. To the copolymer solution, 333 g of di-tert-butyl-p-cresol was added. Thereafter, cyclohexane was volatilized to obtain a thermoplastic elastomer in accordance with the conventional process (sample R), and the physical properties thereof were measured.

Both the sample Q in accordance with the present process and the sample R in accordance with the conventional process had an equal p-methylstyrene content of 30%. The physical properties of these samples are shown in Table 15, in which the test methods are the same as in Table 1.

TABLE 15

| Item | Samples | |
|---|---|---|
| | Q | R (control) |
| Tensile stress at 300% elongation (kg/cm²) | 14 | 22 |
| Tensile strength (kg/cm²) | 205 | 195 |
| Elongation (%) | 1120 | 960 |
| Residual elongation (%) | 15 | 22 |
| Tear strength (kg/cm) | 41 | 37 |
| Hardness | 54 | 63 |

As shown in Table 15, the sample Q in accordance with the present process is excellent, in general, in physical properties as compared with the sample R in accordance with the conventional process. Further, the sample Q, when stretched, does not cause the necking phenomenon but the sample R does. As evidence therefor, each sample was subjected to 500% elongation, was once released from the tension, and immediately thereafter, the tensile stress at 300% elongation of the sample was measured, whereby the sample Q showed a value of 13 kg/cm² which was substantially the same as the initial value 14 kg/cm², whereas the sample R showed a value of 16 kg/cm², which was considerably lower than the initial value.

Next, a dumbbell of each sample was vertically suspended in the lengthwise direction in air at 105° C., whereby the sample Q was not substantially deformed even after 24 hours, whereas the sample R was cut after 4.5 hours as a result of creep due to its own weight. From this, it is clear that the thermoplastic elastomer in accordance with the present process is excellent in dimension stability at elevated temperatures and superior in thermal resistance as compared with the thermoplastic elastomer in accordance with the conventional process which is equal thereto in p-methylstyrene content.

EXAMPLE 7

In a nitrogen atmosphere, 1.25 mole as active lithium of n-butyllithium was added to a 15 wt.% n-hexane solution of 40.6 kg of a monomer mixture comprising isoprene and styrene in a weight ratio of 20:80, and the mixture was polymerized first at 50° C. for one hour and then at 70° C. for 3 hours. After more than 99% of the total monomers had been polymerized, the resulting active copolymer slurry was further mixed with a 15 wt.% n-hexane solution of 59.4 kg of a monomer mixture comprising isoprene and styrene in a weight ratio of 45:55, and the mixture was polymerized first at 70° C. for 5 hours and then at 85° C. for 2 hours. After substantially all of the additional monomer mixture had been copolymerized, the resulting final copolymer was inactivated by addition of a small amount of water. To the copolymer slurry, 1 kg of phenyl-β-naphthylamine was added as a stabilizer. Thereafter, n-hexane was volatilized to obtain a thermoplastic elastomer in accordance with the present process (sample S), and the physical properties therefor were measured.

For comparison, a sample T was prepared in the following procedure: In a nitrogen atmosphere, 1.25 mole an active lithium of 1,6-dilithiohexane was added to a 15 wt.% n-hexane solution of 100 kg of a monomer mixture comprising isoprene and styrene in a weight ratio of 35:65, and the mixture was polymerized first at 50° C. for one hour, then at 70° C. for 4 hours and finally at 85° C. for 3 hours. After substantially all of the monomer mixture has been polymerized, the resulting final copolymer was inactivated by addition of a small amount of water. To the copolymer slurry 1 kg of phenyl-$\beta$-naphthylamine was added as a stabilizer. Thereafter, n-hexane was volatilized to obtain a thermoplastic elastomer in accordance with the conventional process (sample T), and the physical properties thereof were measured.

Both the sample S in accordance with the present process and the sample T according to the conventional process had an equal styrene content of 65% by weight. The physical properties of these samples are shown in Table 16, in which the test methods are the same as in Table 1.

TABLE 16

| Item | Samples | |
|---|---|---|
| | S | T (control) |
| Tensile stress at 300% elongation (kg/cm$^2$) | 39 | 52 |
| Tensile strength (kg/cm$^2$) | 215 | 190 |
| Elongation (%) | 780 | 760 |
| Residual elongation (%) | 120 | 200 |
| Tear strength (kg/cm) | 41 | 38 |
| Hardness | 90 | 96 |

As is clear from Table 16, the sample S according to the present process is high in tensile strength and tear strength and low in residual elongation and is thus excellent in physical properties as compared with the sample T according to the conventional process.

EXAMPLE 8

In a nitrogen atmosphere, 1.0 mole as active lithium of n-butyllithium was added to a 20 wt.% n-hexane solution of 12.5 kg of a monomer mixture comprising 1,3-butadiene and styrene in a weight ratio of 40:60, and the mixture was polymerized at 60° C. for 4 hours. After more than 99% of the total monomers had been polymerized, the resulting active copolymer solution was further mixed with a 20 wt.% n-hexane solution of 87.5 kg of a monomer mixture comprising 1,3-butadiene and styrene in a weight ratio of 91.5:8.5, and the mixture was polymerized first at 70° C., for 4 hours and then at 85° C. for 2 hours. After substantially all of the additional monomers had been copolymerized, the resulting final copolymer was inactivated by addition of a small amount of water. To the copolymer solution, 1 kg of phenyl-$\beta$-naphthylamine was added as a stabilizer. Thereafter, n-hexane was volatilized to obtain a thermoplastic elastomer in accordance with the present process (sample U), and the physical properties thereof were measured.

For comparison, a sample V was prepared in the following procedure: In a nitrogen atmosphere, 1.0 mole as active lithium of n-butyllithium was added to a 20 wt.% toluene solution of 15 kg of styrene, and the mixture was polymerized at 25° C. for 2 hours. After confirming that the conversion of styrene had reached about 50%, the resulting active polystyrene solution containing residual styrene was mixed with a 20 wt.% toluene solution of 80 kg of 1,3-butadiene, and the mixture was polymerized first at 50° C. for 2 hours and then at 80° C. for 4 hours. After substantially all of the additional 1,3-butadiene and the residual styrene had been copolymerized, the resulting final copolymer was inactivated by addition of a small amount of water. To the copolymer solution, 1 kg of phenyl-$\beta$-naphthylamine was added. Thereafter, toluene was volatilized to obtain a thermoplastic elastomer in accordance with the conventional process (sample V), and the physical properties were measured.

Both the sample U in accordance with the present process and the sample V in accordance with the conventional process had an equal styrene content of 15% by weight. The physical properties of these samples are shown in Table 17, in which the test methods are the same as in Table 1.

TABLE 17

| Item | Samples | |
|---|---|---|
| | U | V (control) |
| Tensile stress at 300% elongation (kg/cm$^2$) | 9 | 16 |
| Tensile strength (kg/cm$^2$) | 125 | 108 |
| Elongation (%) | 1200 | 1040 |
| Residual elongation (%) | 20 | 35 |
| Tear strength (kg/cm) | 33 | 30 |
| Hardness | 40 | 47 |

As is clear from Table 17, the sample U according to the present process is high in tensile strength and tear strength and low in residual elongation and shows excellent physical properties as compared with the sample V according to the conventional process.

EXAMPLE 9

This example shows the cases where the additional copolymerization operation was effected one, 2 and 5 times. For comparison, there is also shown the case where no additional copolymerization operation was effected. In this example, all the final copolymers were so regulated as to have an equal styrene content of 35% by weight based on the total amount of 1,3-butadiene and styrene, and the amount of polymerization initiator to be added was regulated to 78 m mole per 10 kg of the total monomer.

(1) The case where the additional copolymerization operation was effected one time:

In a nitrogen atmosphere, 78 m mole as active lithium of n-butyllithium was added to a 20 wt.% n-hexane solution of 3.5 kg of a monomer mixture comprising 1,3-butadiene and styrene in a weight ratio of 50:50, and the mixture was polymerized at 55° C. for 4 hours. After more than 99% of the total monomers had been copolymerized, the resulting active copolymer solution was further mixed with a 20 wt.% n-hexane solution of 6.5 kg of a monomer mixture comprising 1,3-butadiene and styrene in a weight ratio of 63:37, and the mixture was polymerized at 70° C. for 5 hours. After more than 99% of the additional monomer mixture had been copolymerized, the resulting final copolymer was inactivated by addition of a small amount of water. To the copolymer solution, 100 g of phenyl-$\beta$-naphthylamine was added as a stabilizer. Thereafter, n-hexane was volatilized to obtain a thermoplastic elastomer according to one time additional copolymerization operation (sample W). The sample W was pressed at an elevated temperature to prepare a dumbbell and the physical properties thereof were measured.

(2) The case where the additional copolymerization operation was effected 2 times:

In a nitrogen atmosphere, 78 m mole as active lithium of n-butyllithium was added to a 20 wt. % n-hexane solution of 2.34 kg of a monomer mixture comprising 1,3-butadiene and styrene in a weight ratio of 50:50, and the mixture was polymerized at 55° C. for 4 for 4 hours. After more than 99% of the total monomers had been polymerized, the resulting active copolymer solution was mixed with a 20 wt.% n-hexane solution of 5.32 kg of a monomer mixture comprising 1,3-butadiene and styrene in a weight ratio of 78:22, and the mixture was polymerized at 65° C. for 5 hours. After more than 99% of the first time additional monomer mixture had been copolymerized, the resulting copolymer solution was further mixed with a 20 wt.% n-hexane solution of 2.34 kg of a monomer mixture comprising 1,3-butadiene and styrene in a weight ratio of 50:50, and the mixture was polymerized at 70° C. for 5 hours. After more than 99% of the second time additional monomer mixture had been copolymerized, the resulting final copolymer was inactivated by addition of a small amount of water. To the copolymer solution, 100 g of phenyl-$\beta$-naphthylamine was added as a stabilizer. Thereafter, a n-hexane was volatilized to obtain a thermoplastic elastomer according to two time additional copolymerization operations (sample X). The sample X was pressed at an elevated temperature to prepare a dumbbell and the physical properties thereof were measured.

(3) The case where the additional copolymerization operation was effected 5 times:

In a nitrogen atmosphere, 78 m mole as active lithium of n-butyllithium was added to a 20 wt.% n-hexane solution of 1.667 kg of a monomer mixture comprising 1,3-butadiene and styrene in a weight ratio of 65:35, and the mixture was polymerized at 55° C. for 4 hours. After more than 99of the total monomers had been polymerized, the resulting active copolymer solution was mixed with a 20 wt.% n-hexane solution of 1.667 kg of a monomer mixture of 1,3-butadiene and styrene in a weight ratio of 65:35, and the mixture was polymerized at 60° C. for 4 hours. After more than 99% of the first time additional monomer mixture had been copolymerized, the copolymer solution was further mixed with a 20 wt.% n-hexane solution of 1.667 kg of a monomer mixture comprising 1,3-butadiene and styrene in a weight ratio of 65:35, and the mixture was polymerized at 60° C. for 4 hours. Such additional copolymerization operation as above was repeated 5 times. The resulting final copolymerization was inactivated by addition of a small amount of water. To the copolymer solution, 100 g of phenyl-$\beta$-naphthylamine was added as a stabilizer Thereafter, n-hexane was volatilized to obtain a thermoplastic elastomer according to 5 time additional copolymerization operations (sample Y). The sample was pressed with heating to prepare a dumbbell, and the physical properties thereof are measured.

(4) The case where no additional copolymerization operation was effected:

For comparison, a conventional copolymer which had not been subjected to additional copolymerization operation was prepared in the following manner:

In a nitrogen atmosphere, 78 m mole as active lithium of n-butyllithium was added to a 20 wt.% n-hexane solution of 10 kg of a monomer mixture comprising 1,3-butadiene and styrene in a weight ratio of 65:35, and the mixture was polymerized at 55° C. for 5 hours. After substantially all of the total monomers had been polymerized, the resulting active copolymer was inactivated by addition of a small amount of water. To the copolymer solution, 100 g of phenyl-$\beta$-naphthylamine was added. Thereafter, n-hexane was volatilized to obtain a conventional copolymer which had not been subjected to additional copolymerization operation (sample Z). The sample was pressed with heating to prepare a dumbbell, and the physical properties thereof were measured.

The physical properties of the above samples are shown in Table 18, in which the test methods are the same as in Table 1.

TABLE 18

| | Samples | | | |
|---|---|---|---|---|
| Item | W | X | Y | Z (control) |
| Tensile stress at 300% elongation (kg/cm$^2$) | 14 | 11 | 7 | 2 |
| Tensile strength (kg/cm$^2$) | 210 | 105 | 60 | 5 |
| Elongation (%) | 1010 | 1290 | 1420 | 85 |
| Residual elongation (%) | 15 | 44 | 50 | 80 |
| Tear strength (kg/cm) | 37 | 34 | 31 | 5 |
| Hardness | 62 | 54 | 46 | 50 |

As shown in Table 18, all of the sample W obtained by one time additional copolymerization operation, the sample X obtained by two time additional copolymerization operations and the sample Y obtained by five time additional copolymerization operation show elastic properties, but the sample W is particularly high in tensile strength, is low in residual elongation and thus excellent in elastic recovery and is particularly favorable in properties as an elastomer. From this, it is understood that one time additional copolymerization operation is necessary and sufficient in order to obtain preferable thermoplastic elastomers.

The sample Z, a conventional copolymer obtained by effecting no additional copolymerization operation does not show properties as elastomer when it is in an unvulcanized state, and is entirely different from the samples W, X and Y which show properties as elastomers even when they are in an unvulcanized state.

Next, the case where a thermoplastic elastomer of the present invention was obtained by one time additional copolymerization operation using as a polymerization initiator a dilithium hydrocarbon, one of the polylithium hydrocarbons will be shown below.

In a nitrogen atmosphere, 156 m mole as active lithium of 1,2-dilithio-1,2-diphenylethane was added to a 20 wt.% n-hexane solution of 3.5 kg of a monomer mixture comprising 1,3-butadiene and styrene in a weight ratio of 50:50, and the mixture was polymerized at 55° C. for 4 hours. After more than 99% of the total monomers had been polymerized, the resulting active copolymer solution was further mixed with a 20 wt.% n-hexane solution of 6.5 kg of a monomer mixture comprising 1,3-butadiene and styrene in a weight ratio of 63:37, and the mixture was polymerized at 70° C. for 5 hours. After more than 99% of the additional monomer mixture had been copolymerized, the resulting final copolymer was inactivated by addition of a small amount of water. To the copolymer solution, 100 g of phenyl-$\beta$-naphthylamine was added as a stabilizer. Thereafter, n-hexane was volatilized to obtain a thermoplastic elastomer having a styrene content of 35% by weight (sample W') according to one time additional copolymerization operation using a dilithium hydrocarbon as polymerization initiator. The sample W' was pressed with heating to prepare a dumbbell, and the physical properties thereof were measured.

The physical properties of the sample W' are shown in Table 19 together with those of the sample W having a styrene content of 35% by weight which was obtained according to one time copolymerization operation using n-butyllithium as a monolithium hydrocarbon. The test methods in Table 19 are the same as in Table 1.

TABLE 19

| Item | Samples | |
| --- | --- | --- |
| | W | W' |
| Tensile stress at 300% elongation ($kg/cm^2$) | 14 | 10 |
| Tensile strength ($kg/cm^2$) | 210 | 90 |
| Elongation (%) | 1010 | 1300 |
| Residual elongation (%) | 15 | 70 |
| Tear strength (kg/cm) | 37 | 33 |
| Hardness | 62 | 55 |

As shown in Table 19, the sample W' obtained by one time additional copolymerization operation using a dilithium hydrocarbon as polymerization initiator shows elastic properties like the sample W obtained by one time additional copolymerization operation using a monolithium hydrocarbon or polymerization initiator. As a whole, however, the sample W is more excellent in physical properties than the sample W'. From this, it is understood that a monolithium hydrocarbon is particularly preferable as polymerization initiator.

What we claim is:

1. Thermoplastic block copolymer elastomer of conjugated diolefins having 4 to 6 carbon atoms and monovinyl aromatic hydrocarbons, prepared by polymerizing a first charge of 8 to 65 parts by weight of a monomer mixture $A_1$ comprising a conjugated diolefin having 4 to 6 carbon atoms and a monovinyl aromatic hydrocarbon in a weight ratio of 85-10:15-90 in a hydrocarbon solvent and an inert atmosphere in the presence of 0.2 to 20 mmol. per 100 g. of the total amount of the mixture $A_1$ and the mixture $A_2$ described below, of a monolithium hydrocarbon calculated as active lithium to form an active copolymer, and after substantial completion of the polymerization of the first charge, copolymerizing said active copolymer with a second charge of 92 to 35 parts by weight of a monomer mixture $A_2$ comprising the same conjugated diolefin having 4 to 6 carbon atoms and monovinyl aromatic hydrocarbon as said mixture $A_1$ in a weight ratio of 95-20:5-80, such that the total amount of said mixtures $A_1$ and $A_2$ is 100 parts by weight, to thereby obtain a final copolymer having a monovinyl aromatic content of 10 to 70% by weight based on the total amount of said mixtures $A_1$ and $A_2$.

2. Thermoplastic elastomers as claimed in claim 1, wherein the conjugated diolefin is 1,3-butadiene and the monovinyl aromatic hydrocarbon is styrene.

3. Thermoplastic elastomers as claimed in claim 1, wherein the conjugated diolefin is isoprene and the monovinyl aromatic hydrocarbon is styrene.

4. Thermoplastic elastomers as claimed in claim 1, wherein the conjugated diolefin is a mixture of 1,3-butadiene and isoprene and the monovinyl aromatic hydrocarbon is styrene.

* * * * *